US012594824B2

(12) United States Patent　　(10) Patent No.: US 12,594,824 B2
Rori et al.　　(45) Date of Patent: Apr. 7, 2026

(54) CHASSIS ASSEMBLIES FOR ELECTRIC VEHICLES

(71) Applicant: Workhorse Group Inc., Sharonville, OH (US)

(72) Inventors: Hadrian Rori, Sharonville, OH (US); Dave Bjerke, Sharonville, OH (US); Max Lupfer, Sharonville, OH (US)

(73) Assignee: Workhorse Group Inc., Sharonville, OH (US)

( * ) Notice: Subject to any disclaimer, the term of this patent is extended or adjusted under 35 U.S.C. 154(b) by 3 days.

(21) Appl. No.: 18/790,738

(22) Filed: Jul. 31, 2024

(65) Prior Publication Data

US 2025/0042235 A1　　Feb. 6, 2025

Related U.S. Application Data

(60) Provisional application No. 63/517,043, filed on Aug. 1, 2023.

(51) Int. Cl.
| | |
|---|---|
| *B60K 1/04* | (2019.01) |
| *B60G 11/10* | (2006.01) |
| *B62D 21/03* | (2006.01) |
| *H01M 50/249* | (2021.01) |
| *H01M 50/262* | (2021.01) |

(52) U.S. Cl.
CPC ............... *B60K 1/04* (2013.01); *B60G 11/10* (2013.01); *B62D 21/03* (2013.01); *H01M 50/249* (2021.01); *H01M 50/262* (2021.01); *B60K 2001/0438* (2013.01); *H01M 2220/20* (2013.01)

(58) Field of Classification Search
CPC .... B60K 1/04; B60G 11/10; B60G 2204/121; B60G 2204/128; B60G 2300/02; B60G 2300/50; B62D 21/03; B62D 21/02; H01M 50/249; H01M 50/262; H01M 2220/20
See application file for complete search history.

(56) References Cited

U.S. PATENT DOCUMENTS

| | | | | | |
|---|---|---|---|---|---|
| 5,273,195 | A * | 12/1993 | Cucheran | ................ | B60R 9/045 224/326 |
| 6,637,809 | B1 * | 10/2003 | Friede | .................... | B62D 21/02 296/204 |
| 11,325,453 | B2 * | 5/2022 | Friedman | ............ | H01M 50/249 |

(Continued)

*Primary Examiner* — Karen Beck
(74) *Attorney, Agent, or Firm* — Taft, Stettinius & Hollister LLP

(57)　　ABSTRACT

A chassis assembly for an electric vehicle that can include a plurality of cross members having closed section cross sectional configurations that can be generally uniform between opposing flanges that secure the cross members to opposing side rails of a chassis. Such flanges can include asymmetrically arranged orifices that receive fasteners used to secure the cross members to the adjacent side rail. A first battery mounting assembly can extend above a space between the side rails and secure a plurality of batteries in a vertical arrangement. The first battery mounting assembly can accommodate a degree of float between the first and second side rails in a manner that can protect the integrity of the batteries. A second battery mounting assembly can be utilized for mounting other batteries in a manner that can enhance the ease with which those batteries can be removed from at least the chassis assembly.

20 Claims, 20 Drawing Sheets

(56) References Cited

U.S. PATENT DOCUMENTS

| | | | |
|---|---|---|---|
| 2010/0066126 A1* | 3/2010 | Miura | B62D 21/152 |
| | | | 296/193.09 |
| 2021/0188069 A1* | 6/2021 | Friedman | B62D 27/06 |
| 2021/0245596 A1* | 8/2021 | Arana | H01M 50/242 |
| 2025/0042235 A1* | 2/2025 | Rori | B62D 21/03 |

* cited by examiner

CHASSIS ASSEMBLIES FOR ELECTRIC VEHICLES

FIELD OF THE DISCLOSURE

The present disclosure generally relates to chassis assemblies for electric vehicles, and, more specifically, to a chassis assemblies configured for protecting the integrity of one or more batteries of an electric vehicle from damage associated with relative movement about a chassis of the chassis assembly.

BACKGROUND

Unlike traditional internal combustion engines, prime movers of electric vehicles, including hybrid vehicles, are at least partially powered using electrical power that is typically stored by one or more batteries of the electric vehicle. The inclusion of such batteries to power the prime mover of electric vehicles can create issues that may not be of concern, or to the same degree of importance, for vehicles powered by internal combustion engines. For example, certain electric vehicles may not be suited to tolerate the same extent or degree of certain movements, including torsion or twisting, that may be acceptable for vehicles powered by internal combustion engines. Moreover, certain movements, including twisting of at least portions of a frame structure of an electric vehicle, can, if translated to the batteries of the electric vehicle, create issues with respect to at least the integrity of battery cells of the battery(ies).

Accordingly, protecting the integrity of batteries of electric vehicle from potential damage associate with at least torsional forces being imparted on electric vehicles remains an area of interest.

SUMMARY

The present disclosure may comprise one or more of the following features and combinations thereof.

In one embodiment of the present disclosure, a chassis assembly is configured for use with a frame of a vehicle, the chassis assembly comprising a first side rail and a second side rail, the first side rail being generally parallel to, and horizontally offset from, the second side rail. A plurality of cross members that are attached to the first and second side rails can include a plurality of first cross members, each first cross member of the plurality of first cross members having a first cross member body, a first flange, and a second flange. The first cross member body can have a length that extends from a first end of the first cross member body to a second end of the first cross member body. Further, the first cross member body can have a closed cross sectional configuration that is uniform across the length of the first cross member body. The first flange can be secured to the first end and have a plurality of orifices and an aperture that is sized to receive insertion of the first cross member body. The plurality of orifices of the first flange can be configured to each receive a mechanical fastener to attach the first flange to the first side rail. The second flange can be secured to the second end and have a plurality of orifices and an aperture that is sized to receive insertion of the first cross member body. The plurality of orifices of the second flange can be configured to each receive another mechanical fastener to attach the second flange to the second side rail.

In another embodiment, a chassis assembly is configured for use with a frame of a vehicle, the chassis assembly comprising a first side rail that extends between a first end and a second end of the first side rail and a second side rail that extends between a first end and a second end of the second side rail. The first and second side rails can be parallel to each other in a first direction and separated by a space in a second direction, the second direction being orthogonal to the first direction. The chassis assembly can also include a first battery mounting assembly having a cage assembly configured for secure placement of a plurality of batteries in an interior area of the cage assembly. At least a portion of the cage assembly can be positioned above the space. Further, the cage assembly can be directly coupled to only one of the first side rail and the second side rail to provide a degree of float of the cage assembly between first and second side rails in a manner that can protect the integrity of the plurality of batteries. Additionally, the cage assembly can be configured secure the plurality of batteries in a vertically stacked arrangement.

In a further embodiment of the present disclosure, a chassis assembly is configured for use with a frame of a vehicle, the chassis assembly comprising a first side rail that extends in a first direction between a first end and a second end of the first side rail, and a second side rail that extends in the first direction between a first end and a second end of the second side rail. The first and second side rails can be parallel to each other in the first direction and separated by a space in a second direction, the second direction being orthogonal to the first direction. The chassis assembly can also include a battery mounting assembly that is attached to both the first side rail and the second side rail. The battery mounting assembly can descend beneath the space between the first and second side rails. Additionally, the battery mounting assembly can be configured to removably couple at least one battery to the chassis assembly.

Additionally, in a further embodiment of the present disclosure, a chassis assembly is configured for use with a frame of a vehicle, the chassis assembly comprising a first side rail that extends in a first direction between a first end and a second end of the first side rail, and a second side rail that extends in the first direction between a first end and a second end of the second side rail. The first and second side rails can beg parallel to each other in the first direction and separated by a space in a second direction, the second direction being orthogonal to the first direction. Each of the first and second side rails can have a base segment, a first segment, and a second segment, the first and second segments extending in the second direction from opposing ends of the base segment. Further, the base segment, the first segment, and the second segment can define a recess. The chassis assembly can further include a first plurality of suspension mounts coupled to an outer surface of the first side rail, and a second plurality of suspension mounts coupled to an outer surface of the second side rail. Additionally, the chassis assembly can include a plurality of stiffeners. For each of the first and second side rails, a stiffener of the plurality of stiffeners can be secured to a portion, but not all, of at least a base segment. Additionally, each stiffener of the plurality of stiffeners can be position at a location on a corresponding one of the first or second rail that aligns with at least one of the first plurality of suspension mounts and the second plurality of suspension mounts.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 17 illustrates a front side perspective view of a support bracket for the battery mounting assembly shown in FIG. 14.

Corresponding reference numerals are used to indicate corresponding parts throughout the several views.

DETAILED DESCRIPTION

Figure 1:
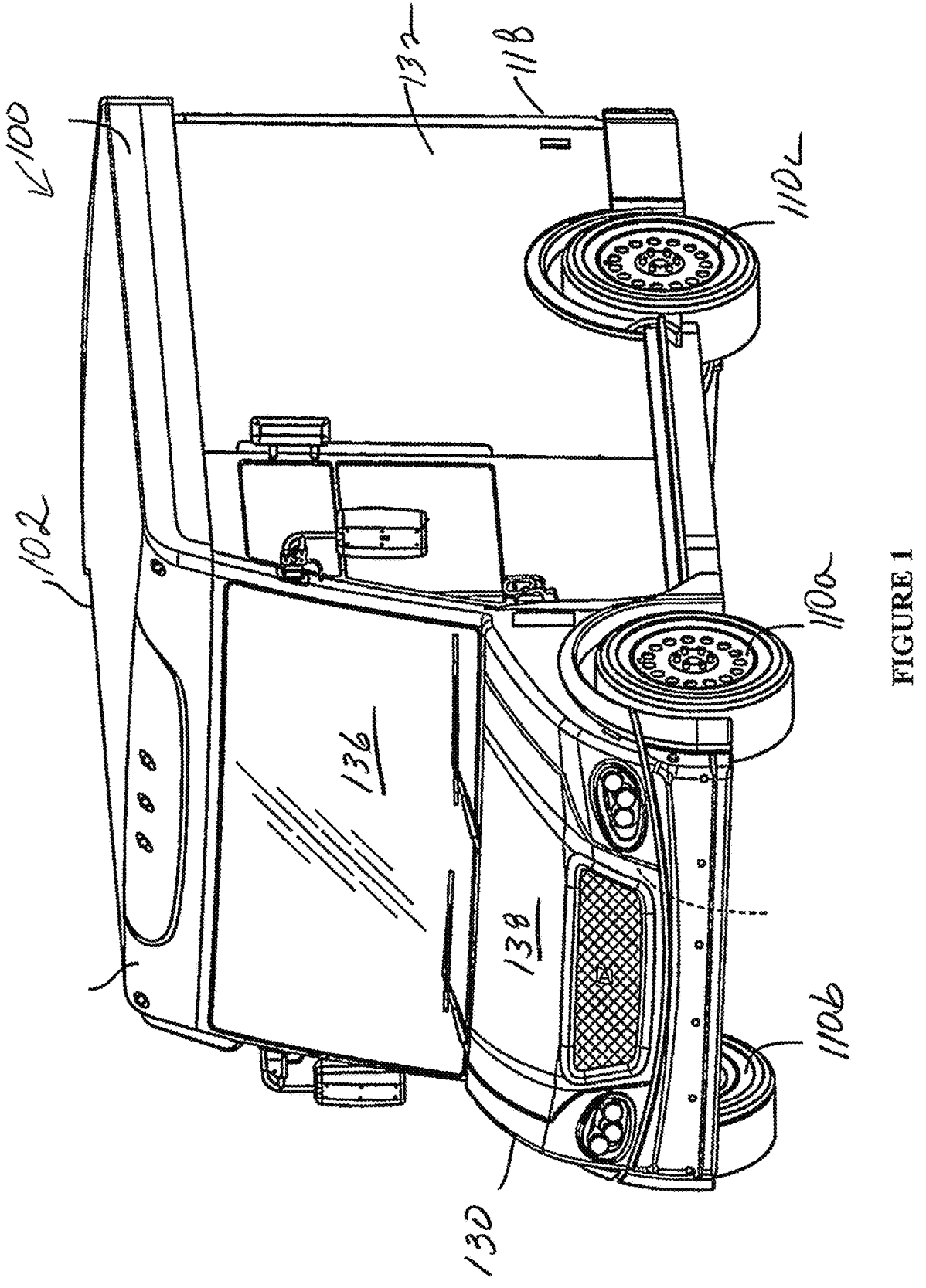
FIG. 1 illustrates a front perspective view of an exemplary electric vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Figure 2:
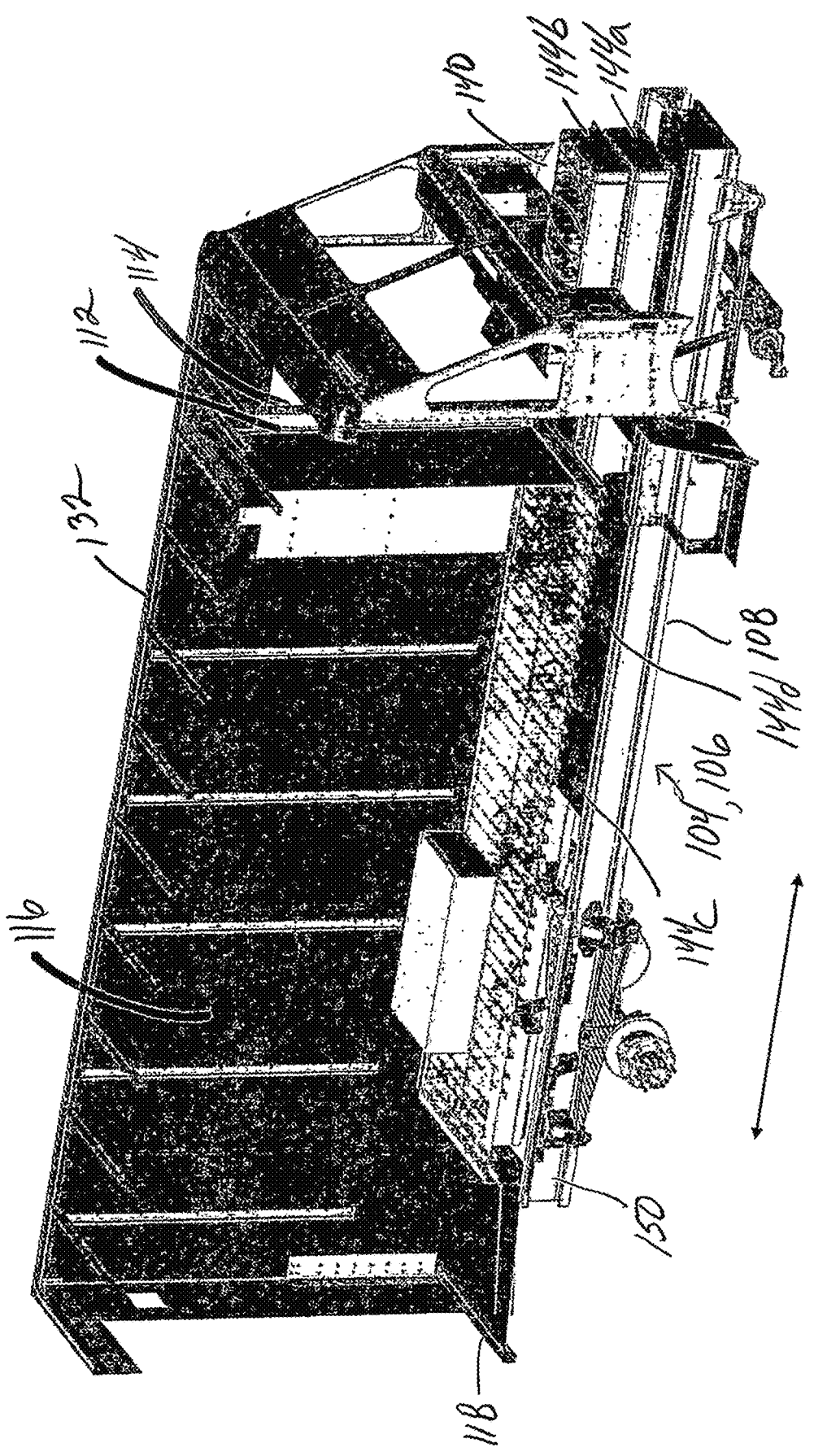
FIG. 2 illustrates a cutaway view of a portion of the vehicle shown in FIG. 1.

FIGS. 1 and 2 illustrate an example of an electric delivery vehicle or truck 100 that is powered by a prime mover. A variety of types of engines or motors can be utilized as the prime mover for the electric vehicle 100, such as, for example, an electric engine or hybrid electric engine/internal combustion engine, among others. Further, the vehicle 100 can be employed in a variety of applications, including consumer, commercial or public service applications. For example, in some embodiments, the vehicle 100 is a delivery vehicle.

The illustrated vehicle 100 includes a body 102 that can be, at least in part, coupled to, and supported by, a frame 104 of the vehicle 100. As discussed below, the frame 104 can include a chassis assembly 106 having a chassis 108 that can be coupled to one or more ground engagement bodies 110, such as, for example, one or more wheels, tires, or tracks, among others, that can engage a ground surface. The frame 104 can include, or otherwise at least partially define, an operator cage 112 that at least partially defines an operator cabin 114 and a rear compartment 116 that can be positioned rearward of the operator cage 112 in a longitudinal direction (i.e., in the lengthwise direction of the vehicle 100). In the illustrated embodiment, when viewed from the rear end 118 of the vehicle 100, the body 102 includes a first sidewall 130 arranged on a right side of the vehicle 100, and a second sidewall 132 arranged on a left side of the vehicle 100 opposite the first sidewall 130. The first and second side-walls 130, 132 extend in the longitudinal direction between opposing front and rear ends 134, 118 of the vehicle 100 such that the first and second sidewalls 130, 132 cooperate to at least partially define the operator cage 112 and the rear compartment 116.

Figure 5:
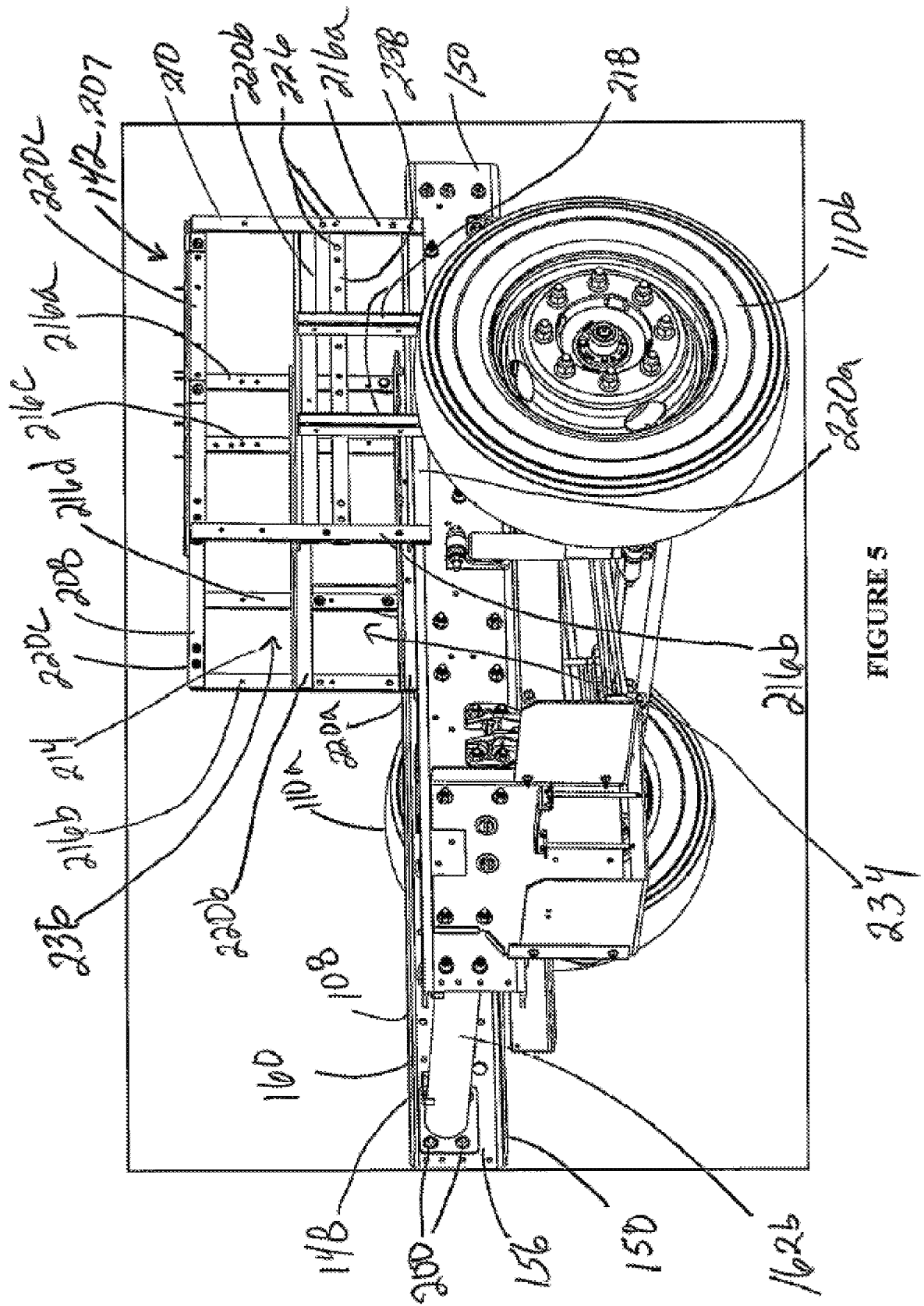
FIG. 5 illustrates a perspective view of a section of the chassis assembly generally taken from the perspective of line 6-6 of FIG. 3.
Figure 6:
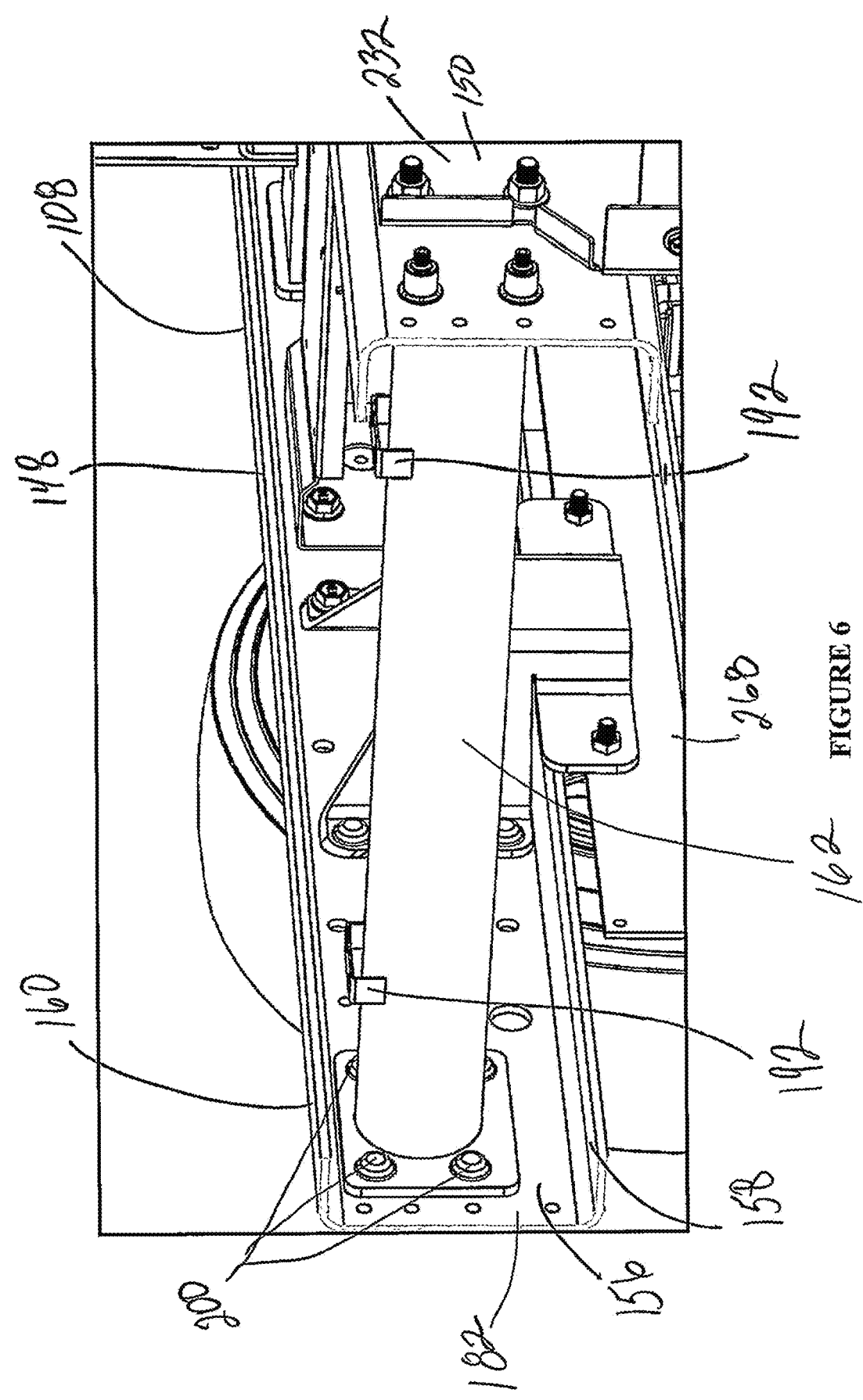
FIG. 6 illustrates an enlarged view of a portion of the section of the chassis assembly shown in FIG. 5.

The illustrated vehicle 100 includes a windshield 136 and a hood 138 arranged at, or near, the front end 134 of the vehicle 100. The windshield 136 permits an operator located in the operator cabin 114 to observe objects disposed in front of the vehicle 100. The hood 138 at least partially defines an internal cavity 140 in which various structures of the vehicle 100 are disposed, such as, for example, a first battery mounting assembly 142 (FIG. 5) that can at least receive placement of one or more batteries 144*a*, 144*b* (FIG. 2) (generally referred to as batteries 144).

Figure 3:
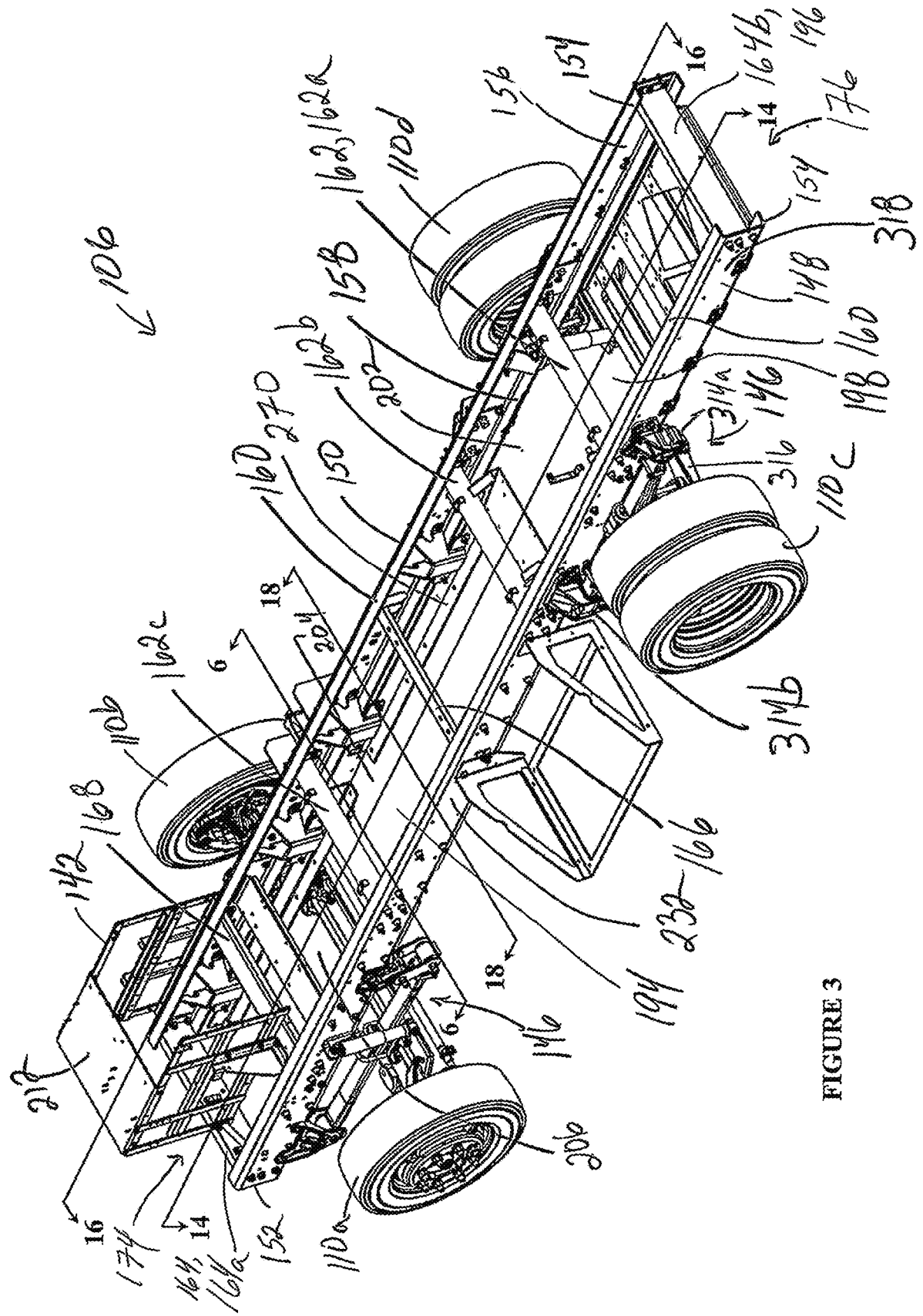
FIG. 3 illustrates a top side perspective view from a rear end of an exemplary chassis assembly.
Figure 4:
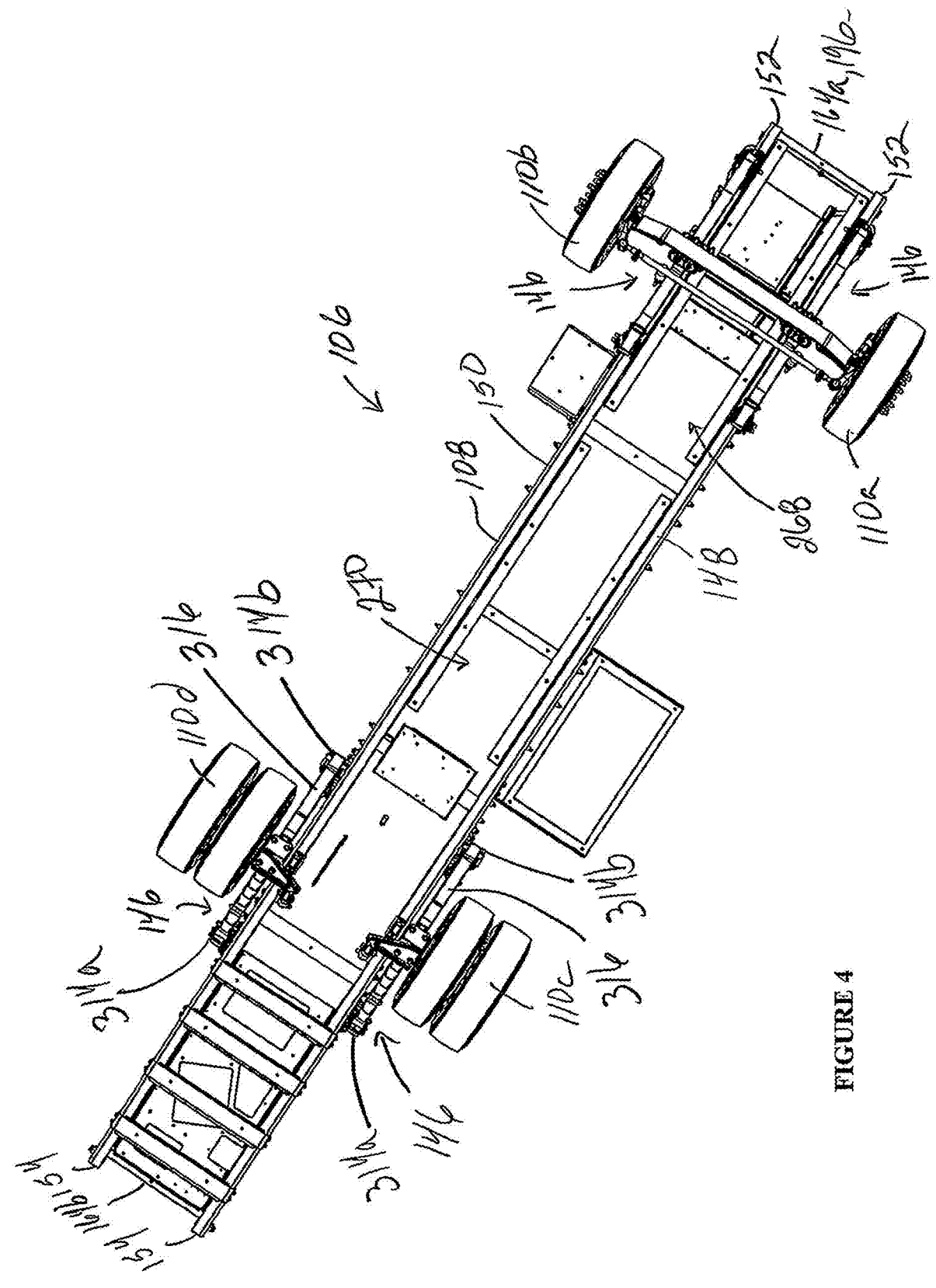
FIG. 4 illustrates a bottom side view of the exemplary chassis assembly shown in FIG. 3.

FIGS. 3 and 4 illustrate an exemplary chassis assembly 106 for use with the vehicle 100, and which may be part of, or coupled to, the frame 104 of the vehicle 100. As seen, at least a portion of a suspension system 146 of the vehicle 100 can be coupled, including attached, to the chassis 108 of the chassis assembly 106, as well as coupled to the ground engagement bodies 110. Further, the suspension system 146 is configured to accommodate some degree of relative movement between at least the chassis 108 and the ground engagement bodies 110 as the vehicle 100 traverses along a ground surface during use of the vehicle 100.

The chassis 108 can include a first side rail 148 and a second side rail 150, each of the first and second side rails 148, 150 extending between a first, front end 152 and a second, rear end 154 of the side rail 148, 150. While the first and second side rails 148, 150 can have a variety of cross-sectional shapes, as well as combinations of shapes, according to the illustrated embodiment the cross-sectional shape of the first and second side rails 148, 150 is generally "C" shaped. According to such an embodiment, the first and second side rails 148, 150 can have a base segment 156 and opposing first and second segments 158, 160 that extend in generally the same direction from opposite ends of the base segment 156. Further, the first and second segments 158, 160 can generally be orthogonal to the base segment 156 such that the base segment 156, first segment 158, and second segment 160 generally define a recess 182 along the side rail 148, 150 that can receive placement of components of the chassis assembly 106 and/or other components of the vehicle 100 that can be coupled to the side rails 148, 150.

As seen in at least FIGS. 3-6, the chassis assembly 106 can include a plurality of cross members 162, 164, 166, 168 that extend between the first and second side rails 148, 150. According to certain embodiments, at least a portion of the plurality of cross members 162, 164, 166, 168 can include one or more first cross members 162*a-c* (generally referred to as cross members 162) having a cross member body 170 defined by a wall 172 that has a generally cylindrical, tubular configuration. Moreover, the wall 172 of the first cross member body 170 can have a generally round, circular, or oval cross-sectional shape, and can generally define a hollow inner region of the cross-member body 170. The wall 172 can have a closed section configuration at least about an outer circumference of the cross-member body 170. Additionally, the cross-sectional shape and size of the wall 172 of the cross-member body 170 can be generally uniform along the entire length of the cross-member body 170. Thus, for example, the cross-member body 170 may not have different shapes, sizes, and/or contours at different portions along a length of the cross-member body 170 in a direction between the side rails 148, 150. Thus, as the cross-sectional shape of the cross-member body 170 can be generally uniform between opposing ends 178, 180 of the cross-member body 170, the first cross member 162 may not include contours that may traditionally be utilized to accommodate a drive shaft or other component of the vehicle 100. Additionally, while the illustrated embodiment depicts a cross member body 170 having a circular cross-sectional shape, other closed section configurations can be used, including, for example, rectangular and square cross-sectional shapes, among other closed section shapes and/or configurations Compared to traditional cross members, including "dog-bone" shaped cross members, the cylindrical or closed section shape and/or configuration of the first cross members 162 can increase the stiffness of the cross member 162, and thereby enhance the stiffness of the chassis assembly 106. Moreover, the extent to which traditional chassis 108 assemblies having traditional cross member configurations can twist, including twisting associated with one side rail 148, 150 moving relative to the other side rail 148, 150, may not be suitable for maintaining the integrity of the electric batteries 144 of electric vehicles 100. Therefore, the enhanced stiffness provided by the generally circular or closed section cross-sectional shape of the first cross members 162*a-c* can be beneficial with respect to at least minimizing torsion or twisting of the chassis assembly 106, or moreover, the frame 104 of the vehicle 100. Thus, the increased stiffness provided by the shape and/or configuration of the first cross members 162 can assist with minimizing twisting of the first side rail 148 relative to the second side rail 150, and vice versa, in manner that, compared to traditional cross members, is more suitable for protecting the integrity of the associated batteries 144, including the integrity of the associated battery cells.

The cross member body 170 can extend from a first end 178 to a second end 180, and can have a length such that the cross member body 170 generally extends at least into recesses 182 generally defined by the "C" shape of the base, first, and second segments 156, 158, 160 of both the first and second side rails 148, 150. Moreover, according to certain embodiments, the cross-member body 170 can extend from the base segment 156 of the first side rail 148 to the base segment 156 of the second side rail 150.

Figure 7:
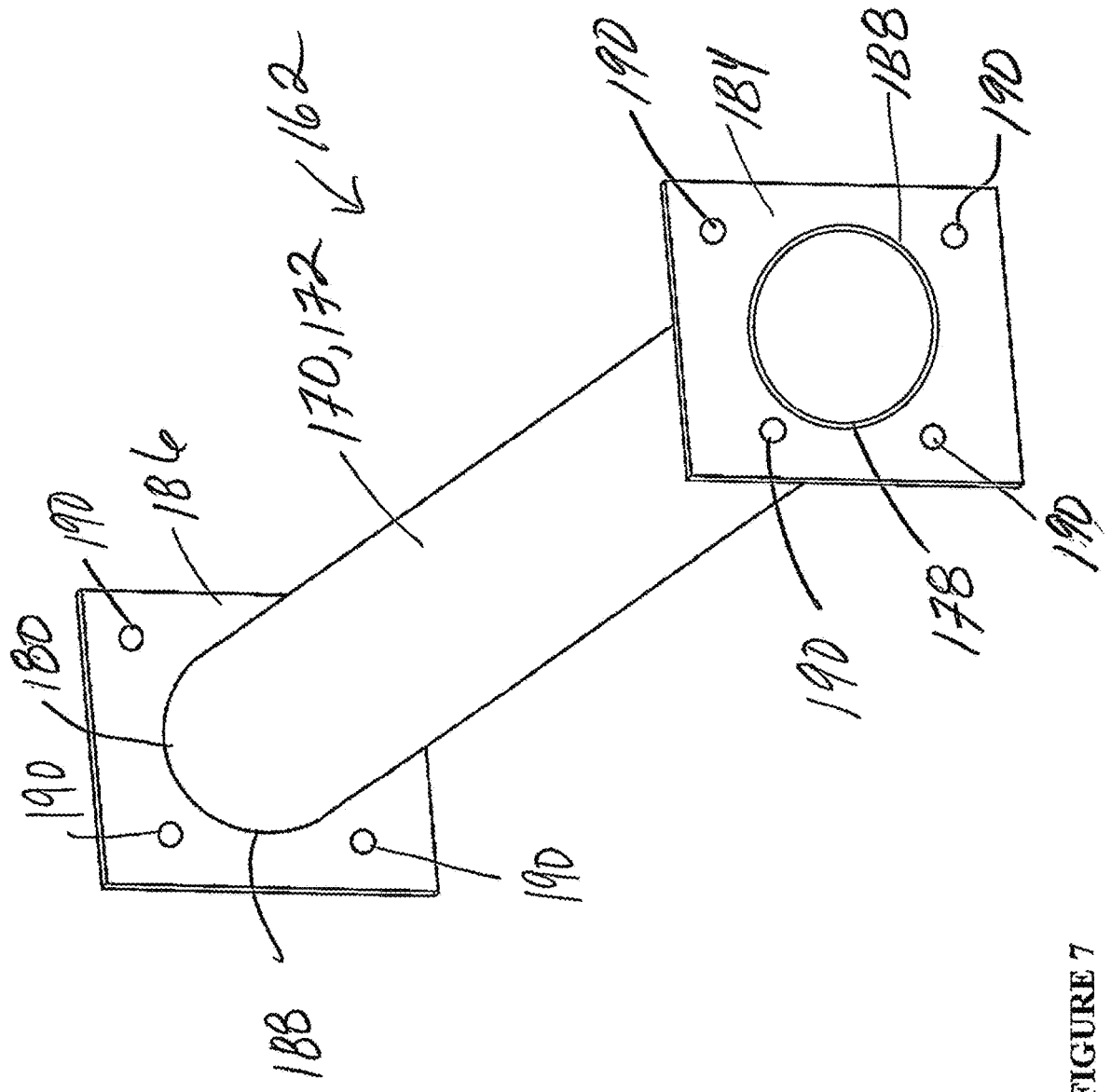
FIG. 7 illustrates a perspective view of an exemplary first cross member.

The first cross member 162 can also include a first flange 184 secured to the first end 178 of the cross-member body 170, and a second flange 186 secured to the second end 180 of the cross-member body 170. While FIG. 7 illustrates, and certain features are discussed herein, with respect to the first flange 184, the second flange 186 can have a similar configuration, and thus similar features, as the first flange 184. As seen in at least FIG. 7, the first flange 184 can include an aperture 188 that is sized to receive placement of at least a portion of the cross-member body 170 within the aperture 188. Moreover, the aperture 188 can have a shape and size that generally conforms to the cross-sectional shape and size of the cross-member body 170 such that at least a portion of the cross-member body 170 can be received within the aperture 188. Thus, according to the illustrated embodiment, the aperture 188 of the first flange 184 can have a generally circular shape. Such a configuration can provide a degree of modularity with respect to the first cross member 164, including with respect to dimensional control of the overall length of the first cross member 164. More specifically, such a configuration accommodates the cross-member body 170 being cut to a specified or predetermined length prior to being secured to the first and/or second flange 184, 186. With such embodiments, upon attaining a desired length between the first and second ends 178, 180 of the cross member body 170, the first end 178 of the cross member body 170 can be inserted into an aperture 188 in the first flange 184, and the second end 180 of the cross member body 170 can be inserted into a corresponding aperture 188 in the second flange 186. With the cross-member body 170 positioned in the apertures 188 of the corresponding first and second flanges 184, 186, the cross-member body 170 can be securely attached to the corresponding flange 184, 186, such as, for example, via a weld that joins the flange 184, 186 to the cross-member body 170.

The first and second flanges 184, 186 can include a plurality of orifices 190 that are sized to receive placement of a mechanical fastener 200 such as, for example, a huck, bolt, or pin among other mechanical fasteners 200, that can securely attach the associated flange 178, 180, and thus the first cross member 164, to the adjacent side rail 148, 150. According to certain embodiments, the first cross members 162 can be secured to the side rails 148, 150 in a manner in which the first cross members 162 are selectively removable or detachable from the side rails 148, 150.

Additionally, according to certain embodiments, the orifices 190 can be asymmetrically arranged about the flange 184, 186 so as to control the orientation at which the first cross member 164 can be secured to the opposing side rails 148, 150. For example, the orifices 190 of the first flange 184 may be arranged in an asymmetrical manner that can accommodate alignment of each of the orifices 190 with a corresponding orifice in the adjacent first or second side rail 148, 150, and/or only one of the first and second side rails 148, 150, when the cross member 164 is at a particular angular orientation relative to the first and/or second side rails 148, 150. Similarly, the orifices 190 of the second flange 186 may be asymmetrically arranged in a manner that can align with corresponding orifices in the other of the first and second side rail 148, 150 when the first cross member 164 is at a particular angular orientation relative to the first or second side rail 148, 150. Such asymmetrical arrangements of the orifices 190 of either, or both, the first and second flanges 184, 186, can assist in controlling the orientation at which the first cross member 164 is secured to the side rails 148, 150. For example, as seen in at least FIG. 6, one or more mounting brackets 192 can be secured to the cross-member body 170 that can assist in routing cables, wires, and/or tubes along a space 194 between at least the first and second side rails 148, 150. Controlling the orientation at which the first cross members 162 can be secured to the side rails 148, 150 via the asymmetrical arrangement of the orifices 190 of either, or both, the first and second flanges 184, 186, can ensure the mounting brackets 192 are at the correct location when the first cross member 164 is secured to the opposing side rails 148, 150. Moreover, such asymmetrical configuration of the orifices 190 can prevent accidental misalignment or erroneous orientation of the first cross members 162 relative to at least the side rails 148, 150 during the assembly of the chassis assembly 106.

As shown in at least FIG. 3, according to certain embodiments, the chassis assembly 106 can include one or more second cross members 164, third cross members 166, and/or fourth cross members 168 having cross-sectional shapes that may, or may not, be different than the cross-sectional shape of the first cross members 162. Additionally, the second, third, and fourth cross members 164, 166, 168 may, or may not, be attached to the first and second side rails 148, 150 in a manner similar to that discussed above with respect to the first cross members 162. For example, according to the illustrated embodiments, the second, third, and/or fourth cross members 164, 166, 168 can also include first and second flanges having orifices that are similar to the above-discussed and illustrated first and second flanges 184, 186 or orifices 190 of the first cross members 162. Similar to the first cross members 162, such orifices of the second, third, and/or fourth cross members 164, 166, 168 may, or may not, be arranged in an asymmetrical arrangement and can be sized to receive passage of a mechanical fastener 200 used to secure the second, third, and/or fourth cross members 164, 166, 168 to the adjacent side rail 148, 150.

According to the embodiment shown in FIG. 3, the plurality of second cross members 164 can comprise a front second cross member 164a that extends between the first and second side rails 148, 150 at a first end 174 of the chassis assembly 106 or front ends 152 of the side rails 148, 150, and a rear second cross member 164b that extends between the first and second side rails 148, 150 at a second end 176 of the chassis assembly 106 or rear end 154 of the side rails 148, 150. According to the illustrated embodiment, each of the second cross members 164a, 164b (generally referred to as second cross members 164) can have a generally square or rectangular cross-sectional shape that can be generally uniform along a length of a cross member body 196 of the second cross member 164. The particular configuration and size of the cross-member body 196 of the second cross members 164 can be based on a variety of different criteria, including, for example, space constraints in terms of at least a space between the second cross member 164 and a first cross member 162.

As seen in FIG. 3, according to the illustrated embodiment, the front second cross member 164a and a proximally located first cross member 162a can generally define a first space 198 around the first end 174 the chassis assembly 106. Additionally, according to certain embodiments, at least a portion of the first space 198 can be located in proximity to, including below, the internal cavity 140 of the vehicle 100, as well as the below-discussed first battery mounting assembly 142. Additionally, the proximal first cross member 162a and an intermediate first cross member 162b can generally define a second space 202 that can be sized to receive placement of at least one battery 144c, 144d (FIG. 2) (also generally referred to as batteries 144). More specifically, according to the illustrated embodiment, the second space 202 can be sized to receive placement of two batteries 144c, 144d between the proximal and intermediate first cross members 162a, 162b.

As also seen in FIG. 3, the third cross member 166 can be positioned in the second space 202 at an intermediate location between the proximal and intermediate first cross members 162a, 162b. According to the illustrated embodiment, the third cross member 166 can have a cross-sectional size that is smaller than the corresponding cross-sectional sizes of the first and second cross members 162, 164. The size of the third cross member 166 can be based on a variety of different criteria, including, area available for the third cross member 166 in the second space 202, including the size of the area that is to be occupied by batteries 144c, 144d of the vehicle 100. Further, according to certain embodiments, compared to the cross-sectional shape of the second cross member 164, the third cross member 166 can have a rectangular cross-sectional size that is narrower than the second cross member 164 in a vertical direction, but is wider in a horizontal direction.

A third space 204 along the chassis assembly 106 can be generally defined between the intermediate first cross member 162b and a distal first cross member 162c, and a fourth space 206 can be generally defined between the distal first cross member 162c and the rear second cross member 164b.

Further, according to the illustrated embodiment, the distal first cross member 162c can be in closer proximity to an adjacent portion of the suspension system 146 associated with rear ground engagement bodies 110c, 110d than the proximal first cross member 162a is to the adjacent portion of the suspension system 146 associated with front ground engagement bodies 110a, 110b. Additionally, according to the illustrated embodiment, neither the proximal nor the distal first cross members 162a, 162c, let alone any other first cross members 162b, are attached to shock mounts of the suspension system 146.

As also seen in FIG. 4, a fourth cross member 168 can be positioned in the first space 198 between the front second cross member 164a and the proximal first cross member 162a. As seen in FIG. 3, according to the illustrated embodiment, the fourth cross member 168 can have a rectangular cross-sectional shape in which the vertical height or width of the fourth cross member 168 is generally similar to the third cross member 166, but in which the fourth cross member 168 is wider than the third cross member 166 in at least a horizontal direction. However, as with the other cross members 162, 164, 166, the size of the fourth cross member 168 can be based on a variety of different criteria, including, the area available for the fourth cross member 168 in the first space 198.

FIGS. 8-13 illustrate views of an exemplary first battery mounting assembly 142 for vertically mounting one or more batteries 144a, 144b that are used in connection with providing power to the electric vehicle 100. According to certain embodiments, the battery mounting assembly 142 includes a cage assembly 207 having a first sidewall 208 and an opposing second sidewall 220. As discussed below, the first sidewall 208, second sidewall 220, and a cover 222 of the cage assembly 207 can generally define an interior area 224 of the cage assembly 207 that is sized to receive a placement of the one or more batteries 144a, 144b that provide and/or store electrical power used to operate at least the prime mover of the vehicle 100.

The battery mounting assembly 142 is configured to tolerate, as well as assist in limiting, a degree of relative movement, including twisting, between at least the first and second side rails 148, 150 in a manner that can protect the integrity of one or more batteries 144a, 144b that are coupled to the battery mounting assembly 142. Further, according to certain embodiments, the cage assembly 207 of the battery mounting assembly 142 can be directly coupled to only one of the first and second side rails 148, 150. For example, only one of the first sidewall 208 or the second sidewall 210 of the cage assembly 207 can be directly attached to a side rail 148, 150. According to such an embodiment, by being directly coupled or attached to only one of the first and second side rails 148, 150, the side rail 148 to which the cage assembly 207 is not directly coupled is able to move to a greater extent relative to the opposing side rail 150 and/or the battery mounting assembly 142 without causing twisting of the batteries 144a, 144b that are secured to the battery mounting assembly 142 in a manner that may adversely impact battery 144a, 144b integrity. Thus, for example, such a configuration can accommodate a degree of float of the side rail 148 to which the cage assembly 207 is not directly attached relative to the other side rail 150. Further, according to certain embodiments, the side rail 150 to which the cage assembly 207 is directly attached can correspond to a passenger side, rather than a driver side, of the vehicle 100.

According to the illustrated embodiment, both of the first and second sidewalls 208, 210 can include a plurality of side straps or brackets 216, as well as a plurality of secondary support straps or brackets 218, that extend in a first direction, and a plurality of base straps or brackets 220 that extend in a second direction, the second direction being different than the first direction. Moreover, in the illustrated embodiment, the first direction can be a generally vertical direction, such as, for example, a direction that is generally orthogonal to the direction at which the side rails 148, 150 extend from opposing ends 152, 154 of the side rails 148, 150. Further, in the illustrated embodiment, the first direction can be generally orthogonal to the second direction. Thus, for example, the base brackets 220 can extend in a second direction that is generally parallel to the direction at which the side rails 148, 150 extend between the opposing ends 152, 154 of the side rails 148, 150.

The base brackets 220 can extend from a first end 222 to a second end 224 of the base brackets 220. According to the illustrated embodiment, for each of the first and second sidewalls 208, 210, the plurality of base brackets 220 can comprise a first, lower base bracket 220a, a second, intermediate base bracket 220b, and a third, upper base bracket 220c (generally referred to herein as base brackets 220). As illustrated, each of the first, second, and third base brackets 220a-c can be generally parallel to each other. Further, each of the base brackets 220a-c can include one or more orifices 226 configured to assist in coupling the base brackets(s) 220a-c to other components, devices, or structures of the vehicle 100 and/or of the battery mounting assembly 142.

According to certain embodiments, one or more of the base brackets 220a, 220b can include a first segment 228 and a second segment 230, the second segment 230 being generally orthogonal to the first segment 228. Thus, as seen in at least FIG. 8, one or more of the base brackets 220a, 220b can have a generally "L" shaped configuration. According to the illustrated embodiment, the first base bracket 220a is positioned to abut, and be attached to, the first side rail 148. Accordingly, the first segment 228 of the first base bracket 220a can be adjacent to, or otherwise abut, an outer surface 232 of the base segment 156 of one of the first or second side rails 148, 150, while the second segment 230 is adjacent to, or otherwise abut, the outer surface 234 along the second segment 160 of the first and/or second side rail 148, 150.

The second base bracket 220b is positioned to provide a first space 234 between the first base bracket 220a and the second base bracket 220b that is sized to receive placement of a first battery 144a. Additionally, similar to the first base bracket 220a, the second base bracket 220b can also have a generally "L" cross-sectional shape such that the second segment 230 of the second base bracket 220b is configured and position to provide a support, or base, for a second battery 144b. Thus, according to the illustrated embodiment, the cage assembly 207 is configured to receive insertion of at least two batteries 144a, 144b for the vehicle 100 into the interior area 214 of the cage assembly 207. The second base bracket 220b can include one or more orifices 226 positioned in the first segment 228 of the second base bracket 220b that can receive a mechanical fastener 200 that can be utilized to attach the second base bracket 220b to one or more side brackets 216, as well as to one or more of the secondary brackets 218. Additionally, the second segment 230 can include one or more orifices 226 that can receive a mechanical fastener 200 that can be utilized to secure the second battery 144b to at least the second base bracket 220b.

The third base bracket 220c can be positioned any distance above the second base bracket 220b that provides, or otherwise does not interfere with, a second space 236 that is size to accommodate receipt of the second battery 144*b* within the interior area 214 of the cage assembly 207. The third base bracket 220*c* may, or may not, include both a first segment 228 and a second segment 230. For example, according to the illustrated embodiment, the third base bracket 220*c* includes a first segment 228, and not a second segment 230. The third base bracket 220*c* can further include a plurality of orifices 226 that can facilitate attachment of the third base bracket 220*c* to a plurality of the side brackets 216. However, the third base bracket 220*c* may, or may not, include orifices 226 that are position to receive a mechanical fastener 200 that can secure a secondary bracket 218 directly to the third base bracket 220*c*.

The third base bracket 220*c* can also be configured to be coupled to the cover 212. According to certain embodiments, the cover 212 can be configured to extend at least partially over a portion of the interior area 214 of the cage assembly 207. For example, as shown in at least FIG. 8, the cover 212 may extend from one end of the third base bracket 220*c* to a midsection of the third base bracket 220*c*. The cover 212 can also be configured to provide a degree of rigidity to the cage assembly 207, and thus to the battery mounting assembly 142.

Figure 8:
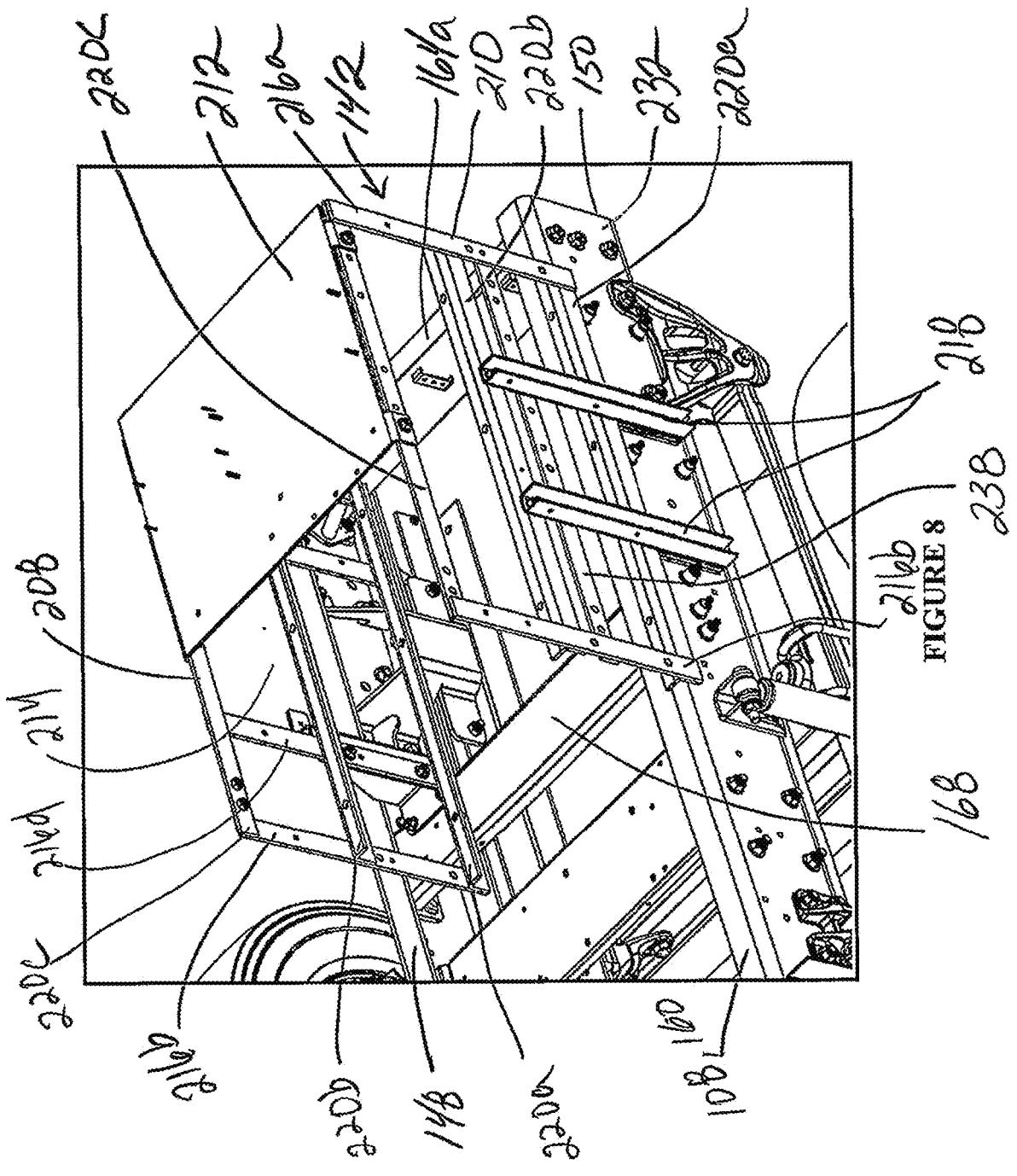
FIG. 8 illustrates a rear side perspective view of an exemplary battery mounting assembly of the chassis assembly shown in FIG. 1.

As seen in at least FIG. 8, according to certain embodiments, at least one of the first and second sidewalls 208, 210 can also include an axillary base bracket 238 that can further enhance the rigidity of the associated sidewall 208, 210. For example, according to certain embodiments, the auxiliary base bracket 238 can be coupled to the sidewall 208, 210 that is directly attached to either the first side rail 148 or the second side rail 150. Thus, in the illustrated example, the auxiliary base bracket 238 is secured to the second sidewall 210. Further, according to certain embodiments, the auxiliary base bracket 238 can have a configuration that is generally similar to that discussed above with respect to the third base bracket 220*c*.

For each of the first and second sidewalls 208, 210, the sidewalls 208, 210 can further include a plurality of side brackets 216 that can include a first side bracket 216*a* and a second side bracket 216*b*. The first side bracket 216*a* can be attached to each of the base brackets 220*a-c* at or around a first end 222 of the base brackets 220*a-c*. The second side bracket 216*b* can also be attached to each of the base brackets 220*a-c* at or around, the second end 224 of the base brackets 220*a-c*. The first and second side brackets 216*a*, 216*b* can also be similarly attached at, or around, the ends of the auxiliary base bracket 238. Additionally, according to the illustrated embodiment, the sidewall 208, 210 that is not directly coupled to a side rail 148, 150, which, in this example, is the first sidewall 208, can further include a pair of intermediate side brackets 216*c*, 216*d* that are positioned between the first and second side brackets 216*a*, 216*b*. Each of the side brackets 216*a-d* (generally referred to as side brackets 216) can include a plurality of orifices 226 that receive a mechanical faster used to couple the side bracket 216*a-d* to an adjacent portion of a base bracket 220 and/or a battery 144*a*, 144*b* that is housed within the interior area 214 of the cage assembly 207.

According to the illustrated embodiment, only one of the first and second sidewalls 208, 210 of the cage assembly 207 can include one or more secondary brackets 218 that can assist in at least preventing angular displacement or twisting of the cage assembly 207. Moreover, the secondary brackets 218 can be configured to couple the cage assembly 207 to one of the adjacent side rails 148, 150. Thus, for example, in the illustrated embodiment, the second sidewall 210 includes secondary brackets 218 that are secured to at least the second side rail 150, as well as attached to other portions of the battery mounting assembly 142. Moreover, the secondary brackets 218 can also be secured to at least one, if not more, of the base brackets 220*a-c* of the sidewall 210. For example, according to the illustrated embodiment, the secondary brackets 218 include one or more orifices 226 through which a mechanical fastener 200 can pass so as to secure the secondary brackets 218 to the adjacent second side rail 150 and the first and second base brackets 220*a*, 220*b* of the second sidewall 210. Further, the secondary brackets 218, which in the illustrated embodiment comprises a pair of secondary brackets 218, can upwardly extend relative to the second side rail 150 and be positioned between at least the first and second side brackets 216*a*, 216*b* of the second sidewall 210 of the cage assembly 207.

While the secondary brackets 218 can have a variety of different shapes and configurations, according to the illustrated embodiment, the secondary brackets 218 have a base segment 240 and a pair of opposing first and second segments 242, 244 that extend in similar directions from opposing ends the base segment 240. Thus, according to the illustrated embodiment, the secondary brackets 218 can have a generally "C" or "U" shaped configuration. The orifices 226 in the base segment 240 of the secondary brackets 218 can be sized to receive a mechanical fastener 200 that can be used to secure the secondary bracket 218 to the second side rail 150 and one or more of the base brackets 220*a-c*

Figure 9:
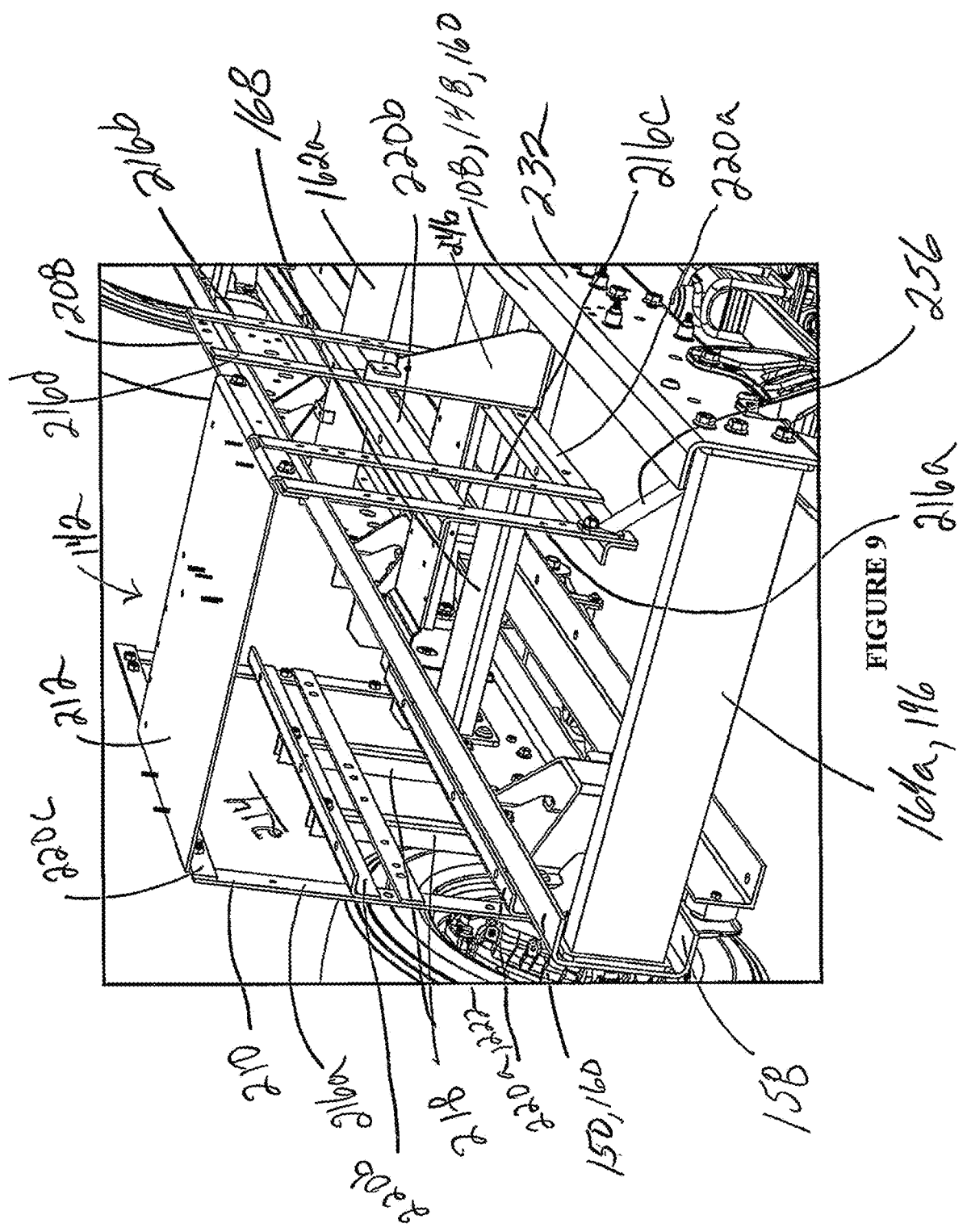
FIG. 9 illustrates a front side perspective view of the exemplary mounting assembly shown in FIG. 8.
Figure 10:
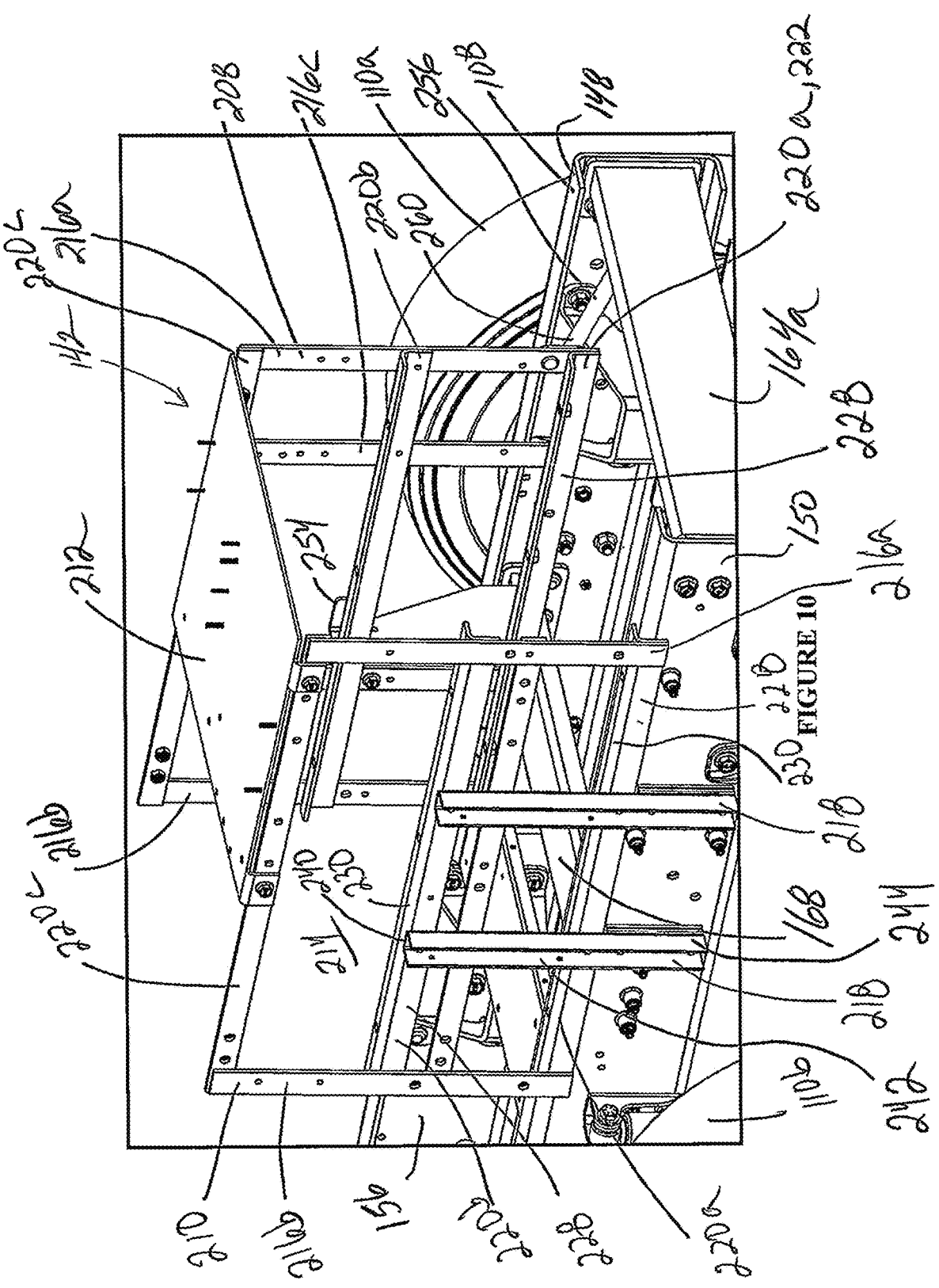
FIGS. 10 and 11 illustrate first side perspective views of the exemplary mounting assembly shown in FIG. 8.
Figure 11:
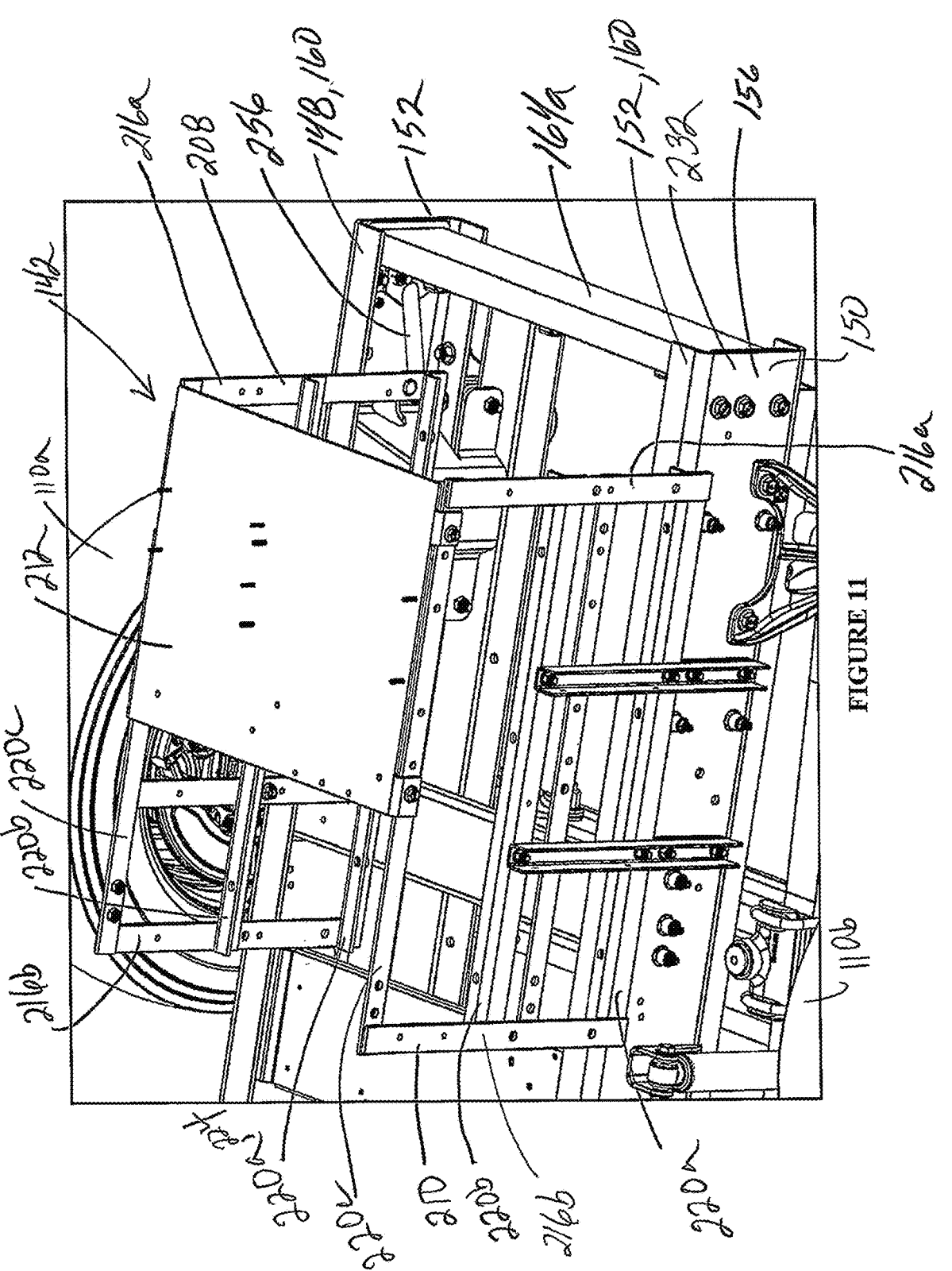
Figure 13:
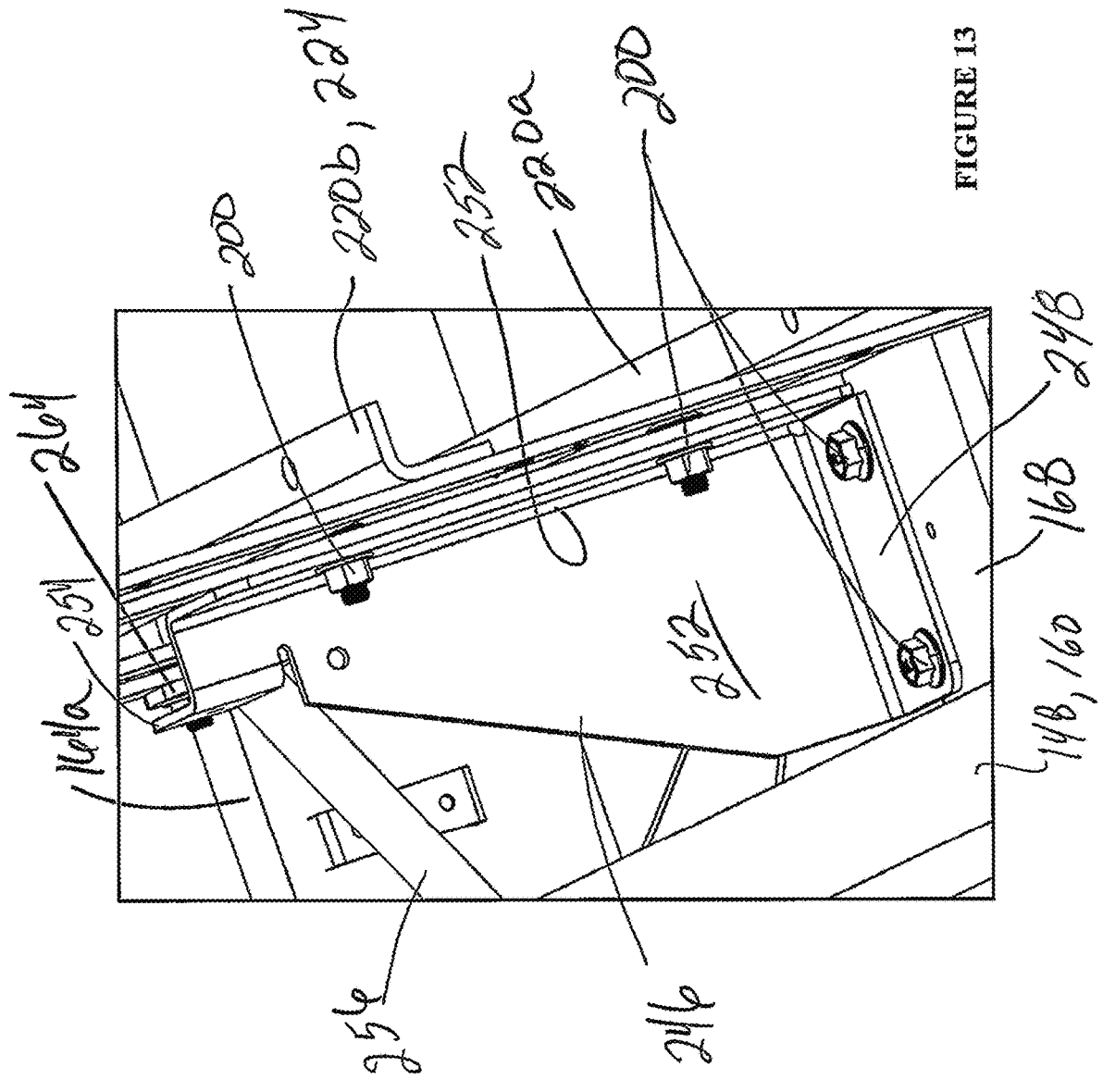
FIG. 13 illustrates a rear side perspective view of an in-plane body of the mounting assembly shown in FIG. 8.
Figure 14:
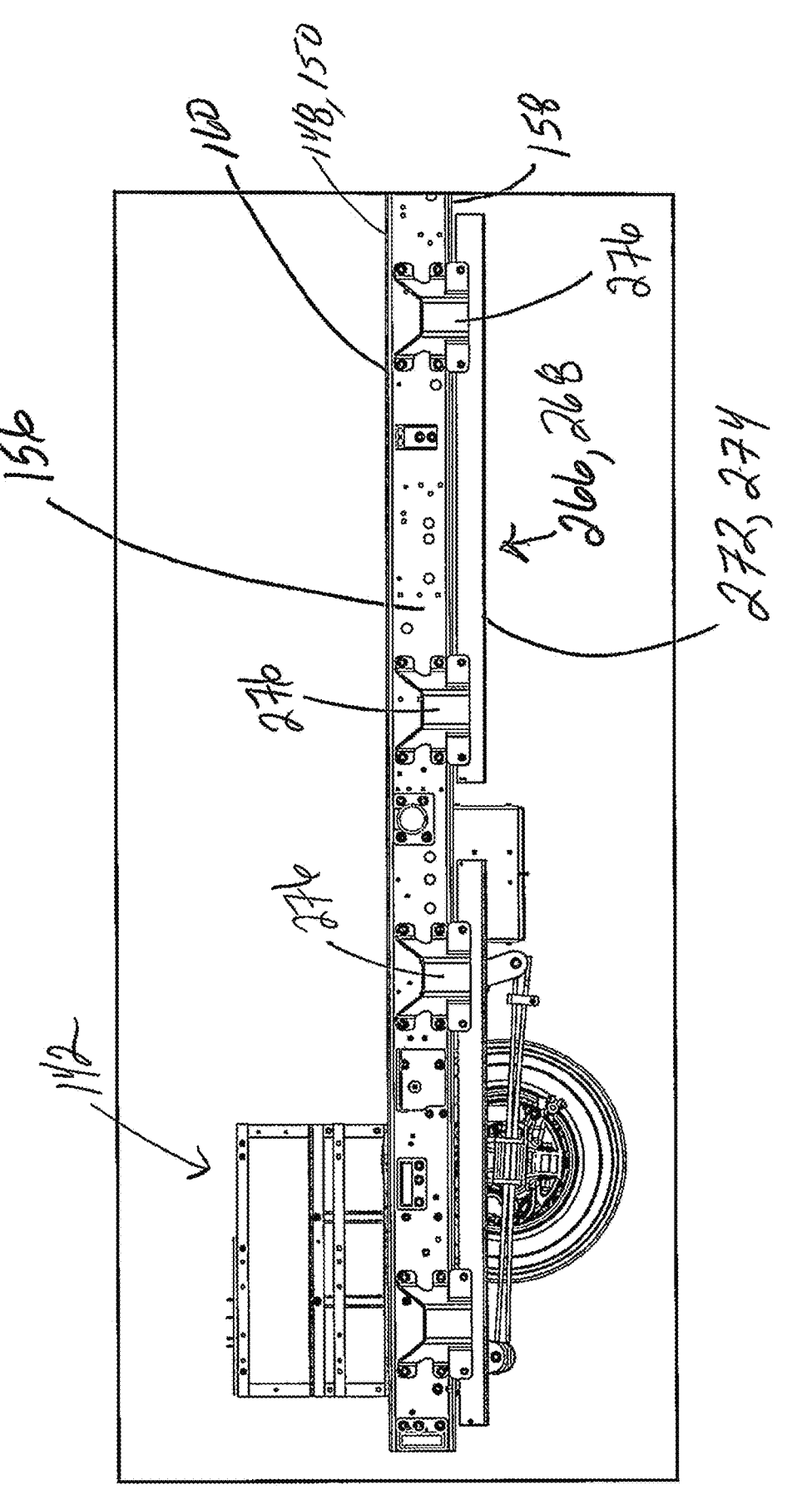
FIG. 14 illustrates another exemplary battery mounting assembly of the chassis assembly taken along a portion of line 14-14 in FIG. 3.

As seen in at least FIGS. 9 and 13, the battery mounting assembly 142 can further include and in-plane body 246 that can be coupled to the first or second sidewall 208, 210 of the cage assembly 207 that is not directly coupled or attached to the adjacent side rail 148, 150. For example, according to the illustrated embodiment in which the second sidewall 210 is directly attached to the second side rail 150, the in-plane body 246 can be secured to both the first sidewall 208 and an adjacent cross member, which, in this example, is the fourth cross member 168. According to the illustrated embodiment, the in-plane body 246 can be used to hold a weight of the batteries 144*a*, 144*b* and the cage assembly 207 on the side of the cage assembly 207 that is not directly coupled to a side rail 148, 150. Further, the in-plane body 246 can be configured to transfer such weight to the adjacent cross member 168. The in-plane body 246 can also be configured to provide rigidity to the cage assembly 207 at least in a direction that is generally orthogonal to the direction to which the side rails 148, 150 extend between the front and rear ends 152, 154 of the side rails 148, 150. Additionally, or alternatively, the in-plane body 246 can be configured to prevent, or minimize, the cage assembly 207 from swaying, or otherwise being pivoted, at least in a direction generally toward the first side rail 148.

The in-plane body 246 can include a first base wall 248 and a second base wall 250, the first base wall 248 extending in a generally horizontal direction so as to abut an upper surface of, and be secured to, the fourth cross member 168. The second base wall 250 can be generally orthogonal to the first base wall 248. Thus, the second base wall 248 can generally extend in a vertical direction from, or around, the first base wall 248 and along an intermediate side bracket 216*c* of the first sidewall 208 to which the second base wall 250 can be attached. The in-plane body 246 can further include an in-plane wall 252 that extends between the first and second base walls 248, 250. The in-plane wall 252 can also be generally planar in a direction that is generally orthogonal to the first and second sidewalls 208, 210, and, moreover, generally orthogonal to the direction extending from front end 152 to the rear end 154 of the side rails 148, 150, as well as generally orthogonal to the adjacent upper surface of the fourth cross member 168. According to the illustrated embodiment, the in-plane body wall 252 and the first base wall 248 can extend a distance away from the first sidewall 208 such that the in-plane wall 252 and the first base wall 248 are within close proximity, but to do not contact, the first side rail 148.

The in-plane body 246 can further include a mounting tab 254 that projects away from the in-plane wall 252 in a direction generally toward the front end 152 of the side rails 148, 150, and is generally orthogonal to the in-plane wall 252. Additionally, the mounting tab 254 can include one or more mounting orifices that can accommodate the in-plane body 246 being coupled to other systems, devices, or components of the vehicle 100.

Figure 12:
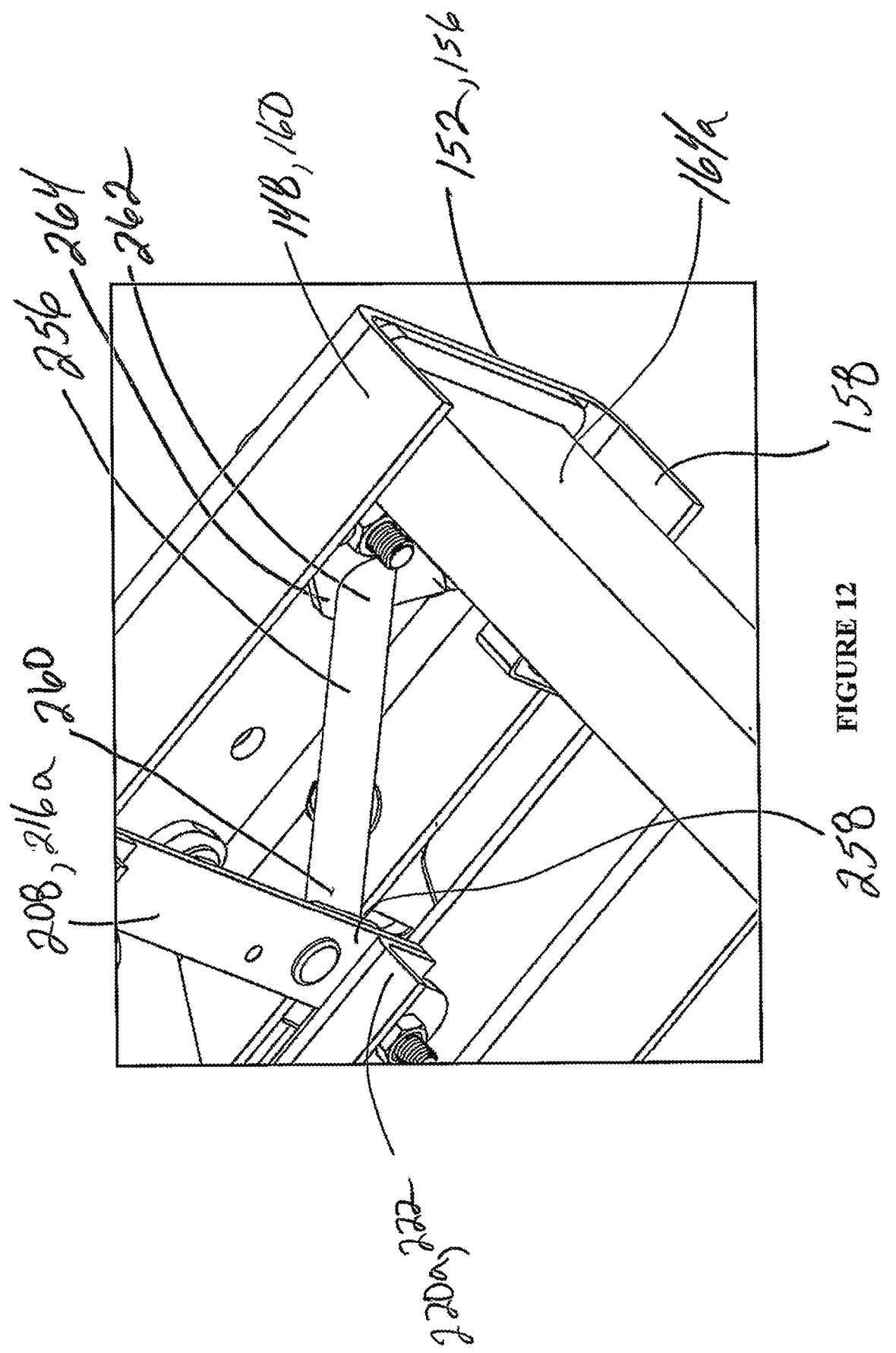
FIG. 12 illustrates a top side perspective view of an anti-dive body of the mounting assembly shown in FIG. 8.

As seen in at least FIG. 12, the battery mounting assembly 142 can further include an anti-dive bar 256. The anti-dive bar 256 can be positioned and configured to extend between the first side rail 148 and a lower corner 258 of the first sidewall 208 of the cage assembly 207. As seen in at least FIG. 8, a lower front corner 258 of the first sidewall 208 of the cage assembly 207 can be suspended over a portion of the first space 198 at a location that is between the front second cross member 164b and the fourth cross member 168, as well as between the first and second side rails 148, 150. The anti-dive bar 256 provides support for at least this suspended portion of the cage assembly 207 that can prevent, or minimize, at least this suspended region of the cage assembly 207, as well as associated batteries 144a, 144b secured within the interior area 214 of the cage assembly 207, from being vertically displaced in at least a downward direction relative to at least the generally adjacent portions of the first side rail 148.

According to the illustrated embodiment, a first end 260 of the anti-dive bar 256 can be coupled to the first sidewall 208 of the cage assembly 207 at a location at which a side bracket 216a overlaps the first end 222 of the first base bracket 2220a. Further, a second end 262 of the anti-dive bar 256 can be coupled to the second side rail 150 at a location that is in relatively close proximity to the front end 152 of the first side rail 148. As the first sidewall 208 is linearly offset from at least the front end 152 of the first side rail 148, the anti-dive bar 256 can extend in the horizontal direction towards the first sidewall 208 of the cage assembly 207 in a direction that is both non-parallel and non-perpendicular to at least the direction at which the first sidewall 208 extends between the first and second side brackets 216a, 216b and the direction at which the front second cross member 164a extends between the first and second side rails 148, 150. For example, the anti-dive bar 256 can extend generally in the horizontal direction at an offset angle of about 60 degrees relative to the first side rail 148, among other angles. Additionally, as the cage assembly 207 is also positioned on top, or above, the first and second side rails 148, 150, the anti-dive bar 256 can also vertically extend in a direction that is also both non-parallel and non-perpendicular to at least the direction at which the second side rail 150 extends between the front and rear ends 152, 154 of the first side rail 150 and the direction at which the front second cross member 164a extends between the first and second side rails 148, 150. For example, the anti-dive bar 256 can extend generally in the vertical direction at an incline angle of about 45 degrees relative to the first side rail 148, among other angles. The direction to which the anti-dive bar 256 is oriented via at least the offset and incline angles of the anti-dive bar 256 can at least attempt to counteract forces in the direction(s) to which the cage assembly 207 and/or associated batteries 144a, 144b may seek to move at least during travel of the vehicle 100.

As also seen in FIGS. 9 and 13, the first and second ends 260, 262 of the anti-dive bar 256 can include flanges 264 having orifices that can receive mechanical fasteners 200 that can secure the anti-dive bar 256 to both the first sidewall 208 of the cage assembly 207 and the first side rail 148. According to the illustrated embodiment, the flanges 264 of the anti-dive bar 256 can extend in directions that are different than the direction at which anti-dive bar 256 extends between the first and second ends 260, 262 of the anti-dive bar 256.

FIGS. 14-18 illustrate another, or second, exemplary battery mounting assembly 266 of the chassis assembly 106. The second battery mounting assembly 266 can be configured and positioned to receive placement of one or more lower batteries 144c, 144d in addition to vertically arranged batteries 144a, 144b secured to the above-discussed cage assembly 207 of the first battery mounting assembly 142. Further, while the above-discussed first battery mounting assembly 142 is configured to be mounted to a plurality of batteries 144a, 144b in a vertically stacked arrangement, the second, exemplary battery mounting assembly 266 can be configured to secure one or more batteries 144c, 144d in a generally horizontal arrangement, including, for example, a generally side-by-side arrangement. Moreover, according to certain embodiments, the second battery mounting assembly 266 can comprise a first portion 268 configured to be coupled to at least a first lower battery 144c, and a second portion 270 configured to be coupled to at least a second lower battery 144d. The first and second portions 268, 270 of the second battery mounting assembly 266 can be arranged such that the first and second lower batteries 144c, 144d are positioned in generally a side-by-side arrangement. According to the illustrated embodiment, one of the first portion 268 is located further towards the front end 174 of the chassis assembly 106 than the second portion 270. Additionally, according to certain embodiments, the first portion 268 can be linearly offset from the second portion 270 in at least the horizontal direction so as to accommodate placement of other components of the vehicle 100 therebetween. Further, according to certain embodiments, the first and second portions 268, 270 can be generally coplanar with each other.

Figure 15:
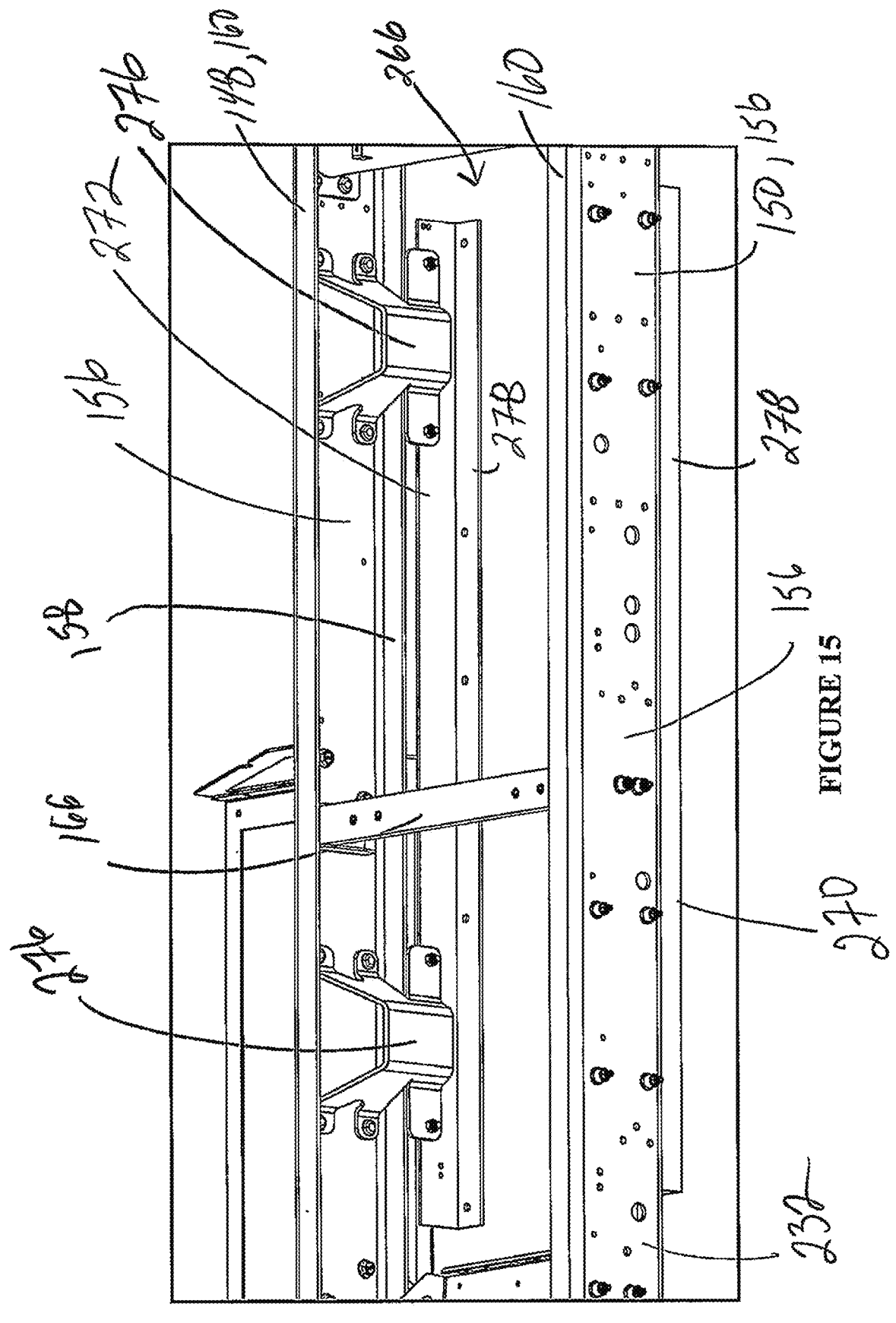
FIG. 15 illustrates a top side perspective view of the battery mounting assembly shown in FIG. 14.
Figure 16:
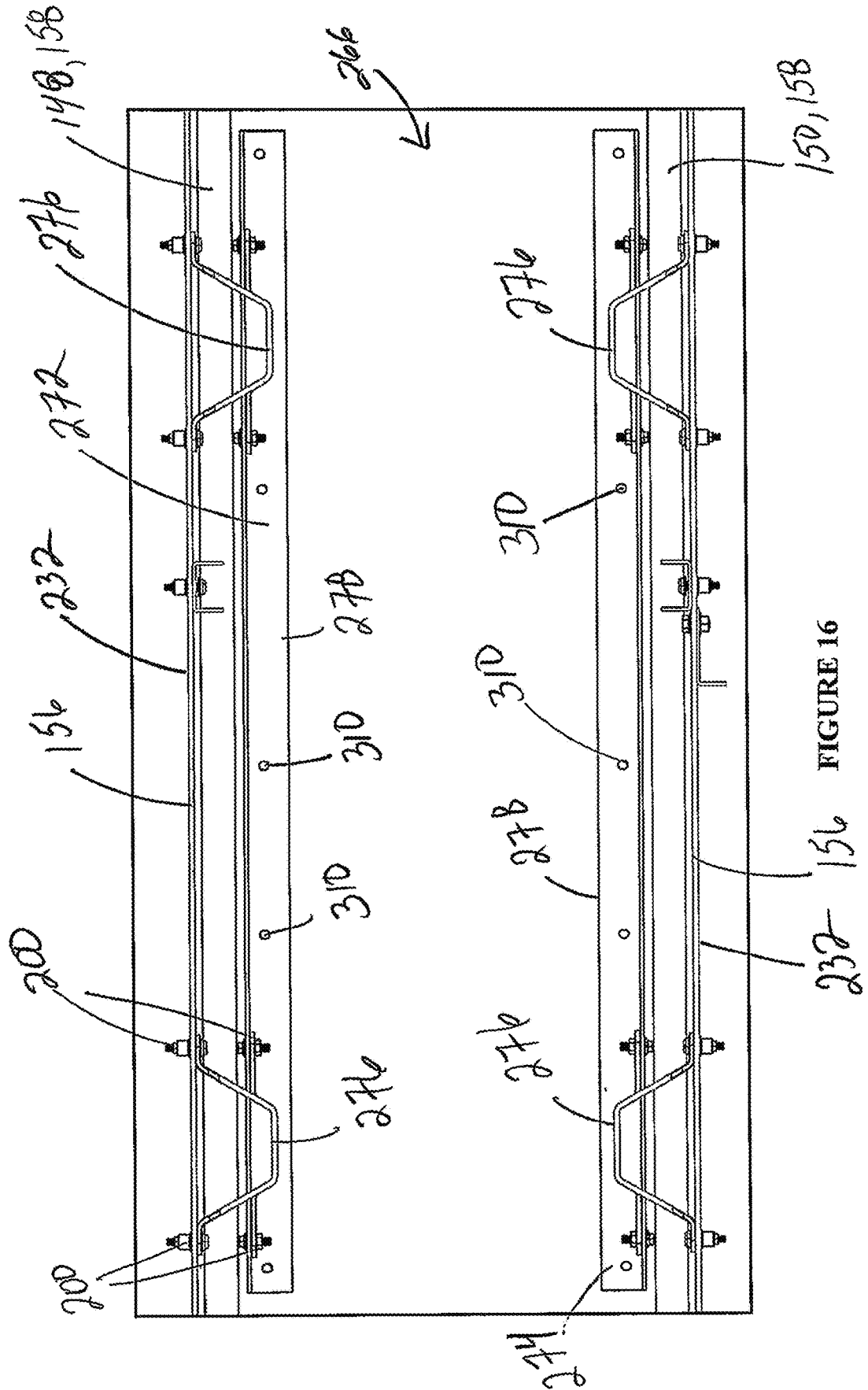
FIG. 16 illustrates a cross sectional view of a portion of the chassis assembly taken along line 16-16 of FIG. 3.

FIGS. 15 and 16 illustrate one of the first and second portions 268, 270 of the second battery mounting assembly 266. However, the first and second portions 268, 270 of the second battery mounting assembly 266 can have generally identical configurations. Thus, unless indicated otherwise, to the extent the below discussion of the battery mounting assembly 266 is in reference to the first portion 268, the discussion is also generally applicable to the second portion 270 of the battery mounting assembly 266.

Each of the first and second portions 268, 270 of the second battery mounting assembly 266 can have a first mounting segment 272 and a second mounting segment 274 that together provide a support for at least one battery 144c, 144d. FIG. 15 primarily depicts an exemplary embodiment of the first mounting segment 272, with the second mounting segment 274 of the first or second portion 268, 270 being partially obscured from view by a side rail 148. However, the second mounting segment 274 can have a configuration that is generally similar to, and/oriented in a manner that is generally a mirror image of, the first mounting segment 272. Thus, unless indicated otherwise, to the extent the below discussion addresses the first mounting segment 272, the discussion can be similarly applicable to the second mounting segment 274.

In the illustrated embodiment, the first and second mounting segments 272, 274 can each include a plurality of mounting brackets 276 and at least one mounting rail 278. The mounting brackets 276 can include a bracket wall 280 having a base wall 282, first sidewall 284, and second sidewall 286. Further, the first and second sidewalls 284, 286 can outwardly extend in divergent directions from the base wall 282. For example, referencing FIG. 17, the distance separating the first and second sidewalls 284, 286 can increase as the first and second sidewalls 284, 286 extend away from the base wall 282 and toward the adjacent base segment 156 of the side rail 148, 150. Further, the bracket wall 280 of the mounting bracket 276 can, from at least a top view, have a generally an open-ended trapezoidal shape, with the open portion or wall of the trapezoidal shape being adjacent to the base segment 156 of the side rail 148, 150. Such a trapezoidal shape can be configured to react to loads in both aft and forward directions in a manner that resists, or prevents, deflection of at least the mounting bracket 276. Further, the area that is generally defined by, or within the boundaries of at least, the first sidewall 284, second sidewall 286, and base wall 282 can, with respect to the mounting bracket 276, generally be hollow.

Figure 17:
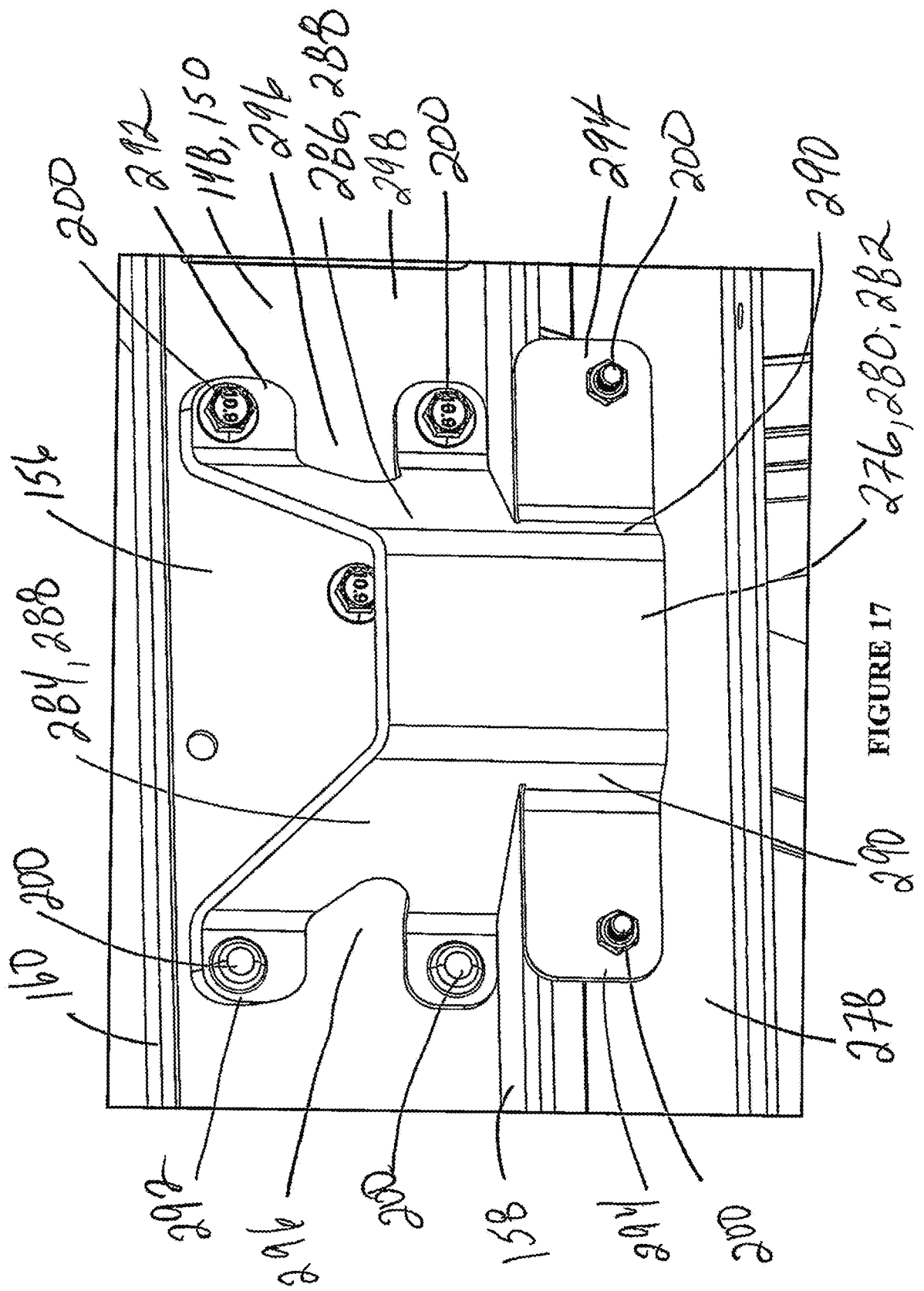
FIG. 17 illustrates a perspective view of a mounting bracket for the battery mounting assembly shown in FIG. 14.
Figure 18:
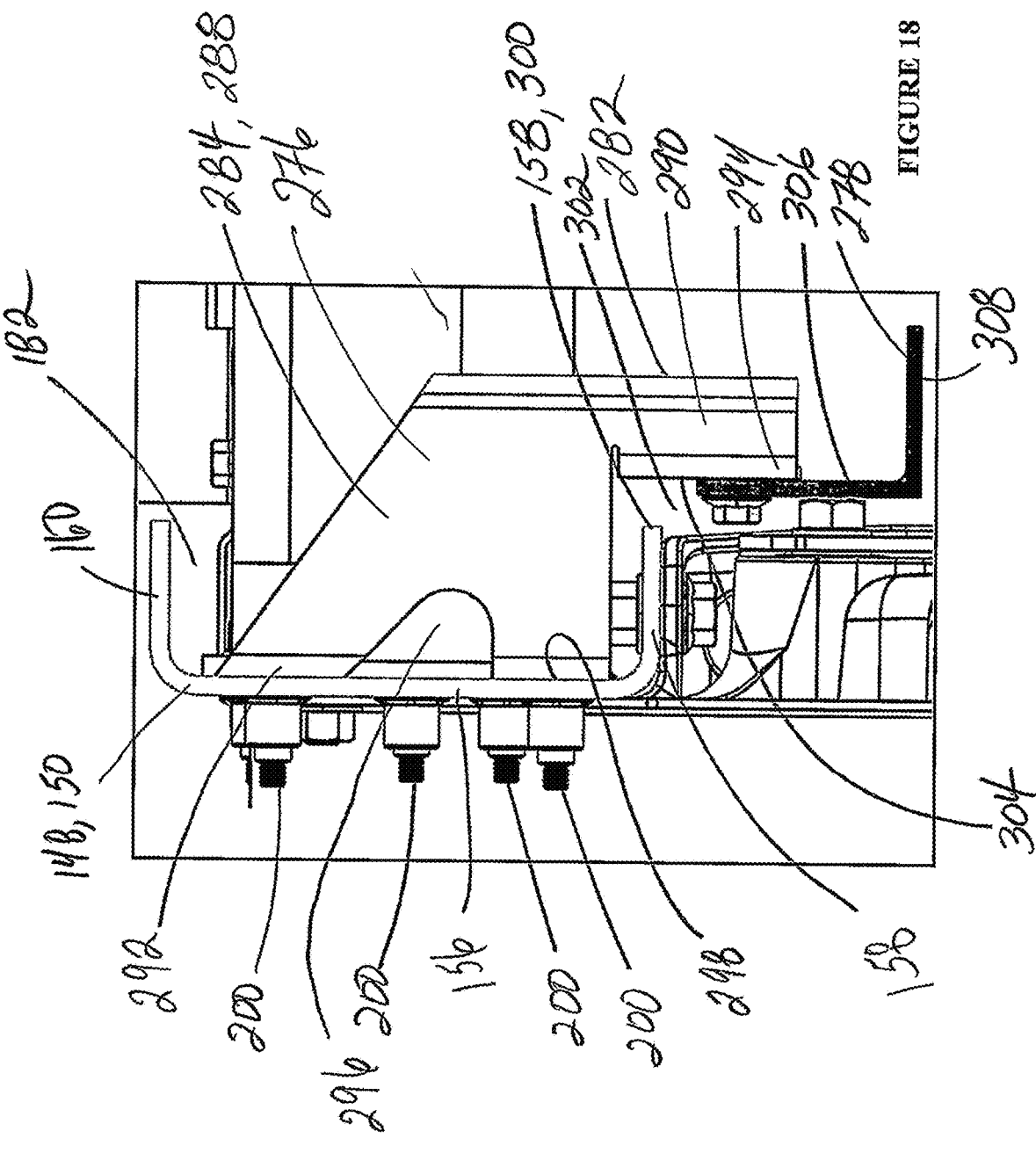
FIG. 18 illustrates a cross sectional view of a portion of the battery mounting assembly shown in FIG. 14 taken along a portion of line 18-18 in FIG. 3.

As seen in at least FIGS. 17 and 18, both the first sidewall and the second sidewall 284, 286 can have an upper segment 288 and a lower segment 290. The upper segment 288 can be configured to extend a distance further from the base wall 282 than the lower segment 290. According to such an embodiment, the upper segment 288 can extend to a first end flange 292, and the lower segment 290 can extend to a second end flange 294. As seen in at least FIGS. 17 and 18, the first and second end flanges 292, 294 can extend in a direction that is generally parallel to the direction in which the side rails 148, 150 extend from the front end 152 to the rear end 154 of the side rails 148, 150. Thus, the first and second end flanges 292, 294 can be generally parallel to the base wall 282 of the mounting bracket 276, while also non-parallel and non-perpendicular to the direction that the first and second sidewalls 284, 286 outwardly extend away from the base wall 282 of the mounting bracket 276. Each of the first and second end flanges 292, 294 can also include one or more orifices that are sized to receive passage of a mechanical fastener 200 that can be utilized to secure the mounting bracket 276 to the adjacent side rail 148, 150 and an associated mounting rail 278, respectively. Additionally, according to the illustrated embodiment, the first end flange 292 can include two orifices as well as a recess 296 that can provide the first end flange 292 with a gap or space generally between the orifices that can at least assist in minimizing the weight of the mounting bracket 276.

As also seen at least FIG. 18, in addition to being vertically offset, the first end flange 292 can be horizontally offset from the second end flange 294. Such an offset arrangement in at least the horizontal direction can accommodate the first end flange 292 being able to be positioned to abut against the inner surface 298 of the base segment 156 of the corresponding side rail 148, 150, while the second end flange 294 can be inwardly offset relative to the end 300 of the adjacent first segment 158 of the side rail 148, 150. Moreover, such an offset arrangement can accommodate the second end flange 294 can be inwardly offset relative to the end 300 of the adjacent first segment 158 by space 302. The size of the space 302, at least in the horizontal direction, separating the first segment 158 of the side rail 148, 150 from the adjacent second end flange 294 of the first and second sidewalls 284, 286 of the mounting bracket 276 can accommodate placement of at least a portion of the mounting rail 278 against a rear surface 304 of the second side end flange 294. Additionally, according to certain embodiments, the second end flange 294 can also be vertically offset from the first segment 158 of the adjacent side rail 148, 150 such that the second end flange 294 is at a lower vertical position than the first segment 158. According to such an embodiment, the second end flange 294 can also be vertically offset from the first segment 158 by a distance that accommodates an upper end of the mounting rail 278 that is positioned in the space 302 being below the first segment 158 of the side rail 148, 150.

According to the illustrated embodiment, the mounting rail 278 can be a generally "L" shaped bracket having a first, vertical segment 306 and a second, horizontal segment 308, the first segment 306 being generally perpendicular to the second segment 310. According to such an embodiment, the first segment 306 can include one or more orifices 310 positioned to align with a corresponding orifice in the second end flange 294 that receives the mechanical fastener 200 that secures the mounting rail 278 to the mounting bracket 276. The second segment 308 can also include one or more orifices 310 that can accommodate a battery 144c, 144d being secured to the mounting rail 278, and thus to the corresponding first or second portion 268, 270 of the second battery mounting assembly 266. The second segments 308 of the mounting rails 278 can thus provide a support for at least one battery 144c, 144d. Additionally, as seen by at least FIG. 18, the second segment 308 of the mounting rail 278 can be at a vertical position that is beneath the adjacent side rail 148, 150. Such a configuration can enhance the case with which physical access can be gained, if needed for example in connection with battery maintenance, to at least an end of the associated mechanical fastener(s) 200 used to at least secure the mounting rail 278 to the mounting bracket 276. Moreover, such a configuration can accommodate access to the fasteners 200 used to secure the mounting rail 278 to an associated mounting bracket 276 with minimal, if any, interference or obstruction from the adjacent side rail 148, 150.

Such access to the mechanical fasteners 200 used to secure the mounting rail 278 to the mounting bracket(s) 276 can enhance the case at which the mounting rail 278 can be detached from the associated mounting brackets 276. Moreover, improving the ability to gain access for detaching the mounting rail 278 from the corresponding mounting bracket(s) 276 can enhance the relative ease with which the battery 144c, 144d that is secured to the mounting rail 278 can also be at least temporarily removed away from the chassis assembly 106, including, for example, for maintenance, repair, and/or replacement of the battery. Further, when the battery 144c, 144d, or a replacement battery, is to again be secured to the chassis assembly 106, the mounting rail 278, with the battery 144c, 144d attached thereto, can again be positioned to receive placement of a mechanical fastener 200 that can secure the mounting rail 278 to the associated mounting bracket 276, thereby returning the battery 144c, 144d to its operable position in the vehicle 100.

Additionally, or alternatively, rather than removing the mounting rails 278, the lower batteries 144c, 144d can be removed from the battery mounting assembly 266 via decoupling the battery(s) 144c, 144d from an associated mounting rail 278 by removing the mechanical fasteners 200 that pass through the second segments of the mounting rails 278. According to such an embodiment, with the battery(s)

144c, 144d decoupled from the associated mounting rails 278, the battery(ies) 144c, 144d can be manipulated so as to be at least temporarily removed from the battery mounting assembly 266, and thus from the vehicle 100.

Figure 19:
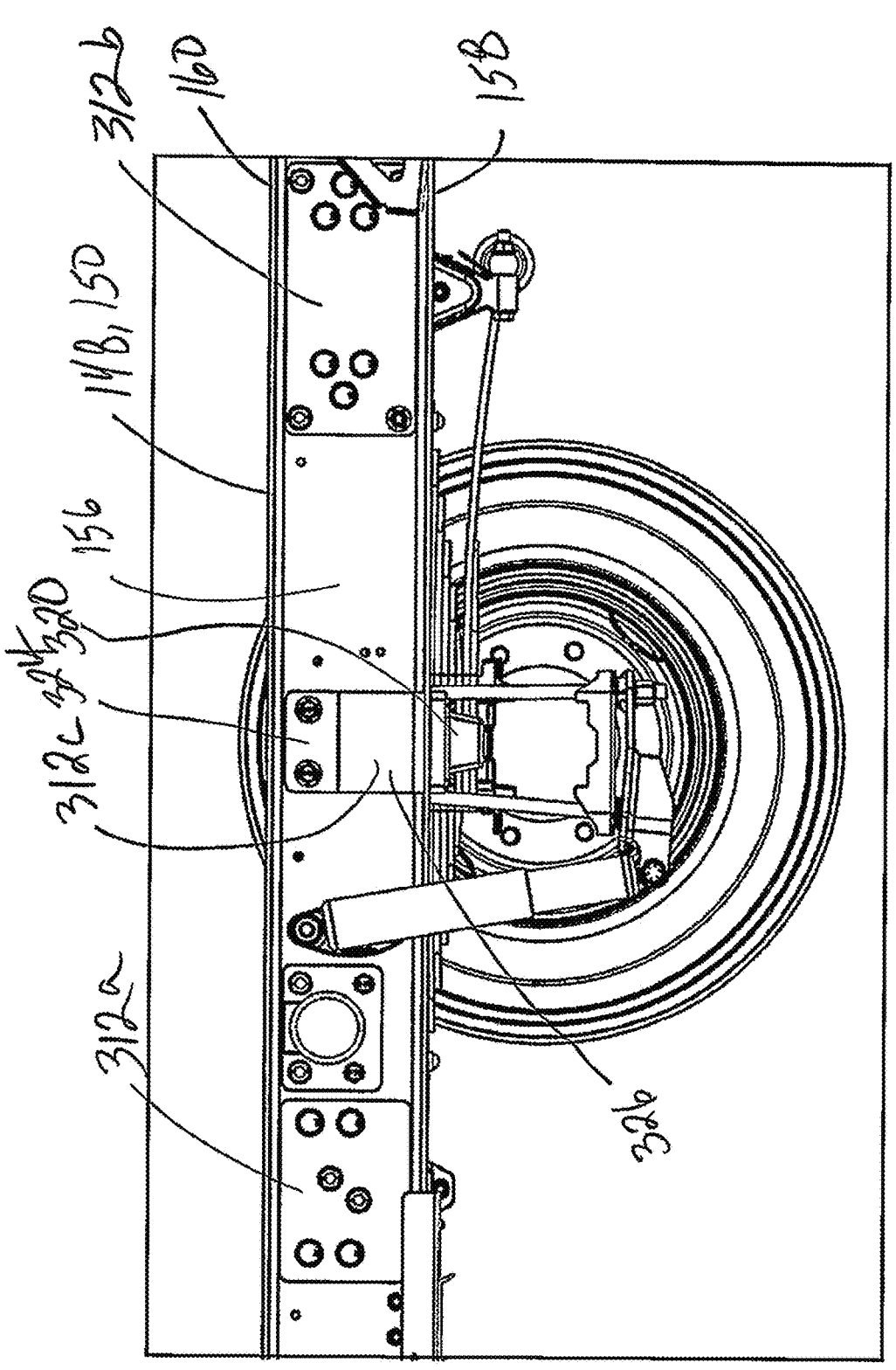
FIG. 19 illustrates a portion of a side rail for the exemplary chassis assembly taken along a portion of the line 14-14 in FIG. 3 that includes a plurality of integral stiffeners.
Figure 20:
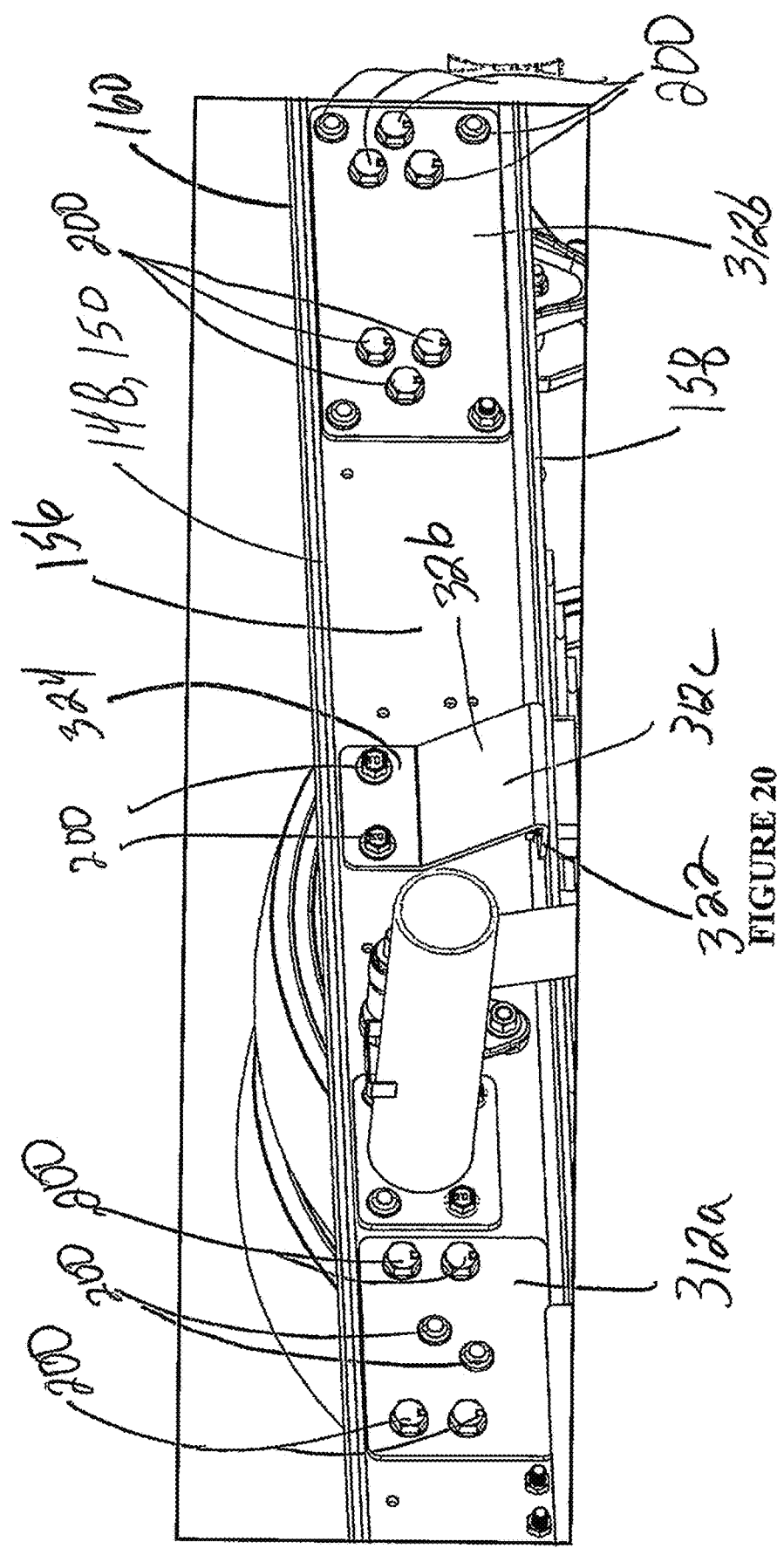
FIG. 20 illustrates a perspective view of the portion of the side rail shown in FIG. 19.

Referencing FIGS. 19 and 20, according to certain embodiments, the chassis assembly 106 can include a plurality of stiffeners 312a, 312b, 312c (generally referred to as stiffeners 312) that can be positioned at various locations along either or both of the side rails 148, 150. The stiffeners 312 can be configured to abut an adjacent portion of at least the base segment 156 of a side rail 148, 150 in a manner that can effectively increase a wall thickness of the side rail 148, 150 at a particular position(s). Moreover, along the length of the side rail 148, 150, the side rail 148, 150 can be subjected to different levels or degrees of stresses or loads. Often, such stresses or loads can be addressed, at least in part, via the selected wall thickness or gauge of material used for the side rail 148, 150. Yet, while a certain wall thickness for the side rail 148, 150 may be sufficient with respect to certain areas along the side rail 148, 150 that are subjected to relatively lower levels of stress for loads, such a wall thickness may be less suitable with respect to at least the integrity of other portions of the side rail 148, 150 that are subjected to higher levels of stresses or loads. Conversely, wall thicknesses for the side rail 148, 150 that may be sufficient to address the higher levels or degrees of loads or stresses that are experienced by some, but not all, portions of the side rail 148, 150, can be excessive for other portions of the side rail 148, 150 that experience relatively lower levels or degrees of loads or stresses, thereby potentially adding unnecessary weight to, and increasing at least associated material costs of, the side rails 148, 150.

Thus, according to certain embodiments, one or more stiffeners 312 can be secured to the side rail 148, 150 at select locations that are anticipated to experience relatively higher levels of loads or stresses than other portions of the side rail 148, 150. Such stiffeners 312 can effectively increase the wall thickness of the side rail 148, 150 in the adjacent area of the side rail 148, 150 so as to provide assistance with addressing localized stresses, and without increasing the wall thickness of other areas of the side rail 148, 150 that can typically be subjected to lower levels or degrees of loads or stresses. Additionally, the inclusion of the stiffeners 312 can assist in relieving the stresses exerted onto the side rail 148, 150 over a larger surface area.

As seen in at least FIGS. 19 and 20, according to certain embodiments, the chassis assembly 106 can, for both the first side rail 148 and the second side rail 150, include a first stiffener 312a and a second stiffener 312b positioned along the inner surface 300 of the base segment 156 at locations that correspond to mounting points for the suspension system 146. For example, as seen in FIG. 3, the suspension system 146 can include a first suspension mount 314a and a second suspension mount 314b coupled to a leaf spring 316 of the suspension system 146. The first and second suspension mounts 314a, 314b can abut, or otherwise be adjacent to, an outer surface 318 of the base segment 156. Moreover, the first and second suspension mounts 314a, 314b can be attached to the side rail 148, 150 at opposing sides of an adjacent rear ground engagement body 110c, 110d of the vehicle 100. According to such an embodiment, the first stiffener 312a and the first suspension mount 314a can be positioned at opposing sides of the base segment 156 of the side rail 148, 150 such that mechanical fasteners 200 that pass through the first suspension mount and the side rail 148, 150 also extend through corresponding orifices in the first stiffener 312a. Similarly, the second stiffener 312b and the second suspension mount 314b can be positioned at opposing sides of the base segment 156 of the side rail 148, 150 such that mechanical fasteners 200 that pass through corresponding orifices of the second suspension mount 314b and the side rail 148, 150 also extend through the second stiffener 312b. While the first and second stiffeners 312a, 312b can have a variety of different configurations, according to the illustrated body, the first and second stiffeners 312a, 312b have a generally flat, rectangular in shape. Additionally, the first and second stiffeners 312a, 312b can, when secured to a side rail 148, 150, be generally coplanar with each other.

Referencing FIG. 20, for each of the first and second side rails 148, 150, the plurality of stiffeners 312 can also include a central or bump stiffener 312c that is securely coupled to both the first segment 158 and the base segment 156 of the side rail 148, 150. The bump stiffener 312c can be configured to assist with relieving stresses along the side rail 148, 150 that are associated with a bump stop 320 of the suspension system 146. According to the illustrated embodiment, the bump stiffener 312c, which can be positioned between the first and second stiffeners 312a, 312b, can include a first segment 322 that can abut, and be secured to, a portion of the base segment 156 of the side rail 148, 150. The first segment 322 can also be generally coplanar with the above mentioned first and second stiffeners 312a, 312b. The bump stiffener 312c can also include a second segment 324 that can be abut, and be securely coupled to, a portion of the first segment 158 of the side rail 148, 150. While the first and second segments 322, 324 of the bump stiffener 312c can have a variety of different configurations, according to the illustrated body, the first and second segments 322, 324 have a generally flat, rectangular shape.

Additionally, each of the first and second segments 322, 324 can include orifices that can receive mechanical fasteners 200 that secure the first and second segments 322, 324 to the side rail 148, 150. The orifices in the second segment 324 can also be positioned to generally align with mating orifices in the bump stop 320 such that mechanical fasteners 200 can extend into each of the bump stop 320, she first segment 158 of the associated side rail 148, 150, and the second segment 324 of the bump stiffener 312c.

The bump stiffener 312c can further include an intermediate wall 326 that extends between, and generally adjoins, the first and second segments 322, 324. According to the illustrated embodiment, the intermediate wall 326 extends between the first and second segments 322, 324 such that, when the bump stiffener 312c is secured to the side rail 148, 150, the intermediate wall 326 is non-parallel and non-perpendicular to both the base segment 156 and the first segment 158 of the side rail 148, 150. Further, the intermediate wall 326 can inwardly and upwardly extend from a portion of the bump stiffener 312c that is generally aligned with, or adjacent to, the end of the first segment 158 of the side rail 148, 150 to a location that is adjacent to, and/or abuts, the base segment 156 of the side rail 148, 150.

One aspect of the present disclosure includes a chassis assembly configured for use with a frame of a vehicle, the chassis assembly comprising: a first side rail and a second side rail, the first side rail being generally parallel to, and horizontally offset from, the second side rail; and a plurality of cross members attached to the first and second side rails, the plurality of cross members comprising a plurality of first cross members, each first cross member of the plurality of first cross members having a first cross member body, a first flange, and a second flange, the first cross member body having a length that extends from a first end of the first cross member body to a second end of the first cross member body, the first cross member body having a closed cross sectional configuration that is uniform across the length of the first cross member body, the first flange secured to the first end and having a plurality of orifices and an aperture that is sized to receive insertion of the first cross member body, the plurality of orifices of the first flange configured to each receive a mechanical fastener to attach the first flange to the first side rail, and the second flange secured to the second end and having a plurality of orifices and an aperture that is sized to receive insertion of the first cross member body, the plurality of orifices of the second flange configured to each receive another mechanical fastener to attach the second flange to the second side rail.

A feature of the present disclosure includes wherein each of the first and second side rails have a base segment, a first segment, and a second segment, the first and second segments extending from opposing ends of the base segment and wherein the base segment, the first segment, and the second segment define a recess.

Another feature of the present disclosure includes wherein the chassis assembly further includes a suspension system that is coupled to both the first side rail and the second side rail, and is not directly coupled to the plurality of first cross members.

Yet another feature of the present disclosure includes wherein the closed cross sectional configuration is a closed loop shape.

Still another feature of the present disclosure wherein the closed section cross sectional configuration is a circular shape.

A further feature of the present disclosure includes wherein the plurality of orifices of at least one of the first flange and the second flange are arranged in an asymmetrical configuration.

Another feature of the present disclosure includes wherein the plurality of orifices of each of the first flange and the second flange are arranged in an asymmetrical configuration.

Yet another feature of the present disclosure includes wherein at least some of the plurality of first cross members include at least one mounting bracket coupled to the first cross member body.

Still another feature of the present disclosure includes wherein the plurality of orifices of at least one of the first flange and the second flange are arranged to orient the at least one mounting bracket in an upwardly direction away from the first cross member body when the first cross member is attached to the first side rail and the second side rail.

A further feature of the present disclosure includes wherein the plurality of first cross members comprises a proximate first cross member, an intermediate first cross member, and a distal first cross member.

Another feature of the present disclosure includes wherein the plurality of cross members further includes a plurality of second cross members having a cross sectional configuration that is different than the closed cross sectional configuration of the first cross member body, the plurality of second cross members comprising a front second cross member and a rear second cross member, the front second cross member being coupled to a front end of each of the first and second side rails, the rear second cross member being coupled to a rear end of each of the first and second side rails.

Yet another feature of the present disclosure includes wherein the front second cross member and the proximal first cross member define, at least in part, a first space, and wherein the chassis assembly further includes a first battery mounting assembly having a cage assembly configured for secure placement of one or more batteries in an interior area of the cage assembly, at least a portion of the cage assembly positioned above the first space, and wherein the cage assembly is directly coupled to only one of the first side rail and the second side rail.

Still another feature of the present disclosure includes wherein the one or more batteries comprises a first plurality of batteries, and wherein the cage assembly is configured to secure the first plurality of batteries within the interior area in a vertically stacked orientation.

A further feature of the present disclosure includes wherein the cage assembly comprises a first sidewall and a second sidewall, one of the first sidewall and the second sidewall being directly coupled to one of the first side rail or the second side rail, the first and second sidewalls being on opposing sides of the cage assembly.

Another feature of the present disclosure includes wherein one of the first sidewall and the second sidewall is coupled to a cross member of the plurality of cross members by an in-plane body of the first battery mounting assembly.

Yet another feature of the present disclosure includes wherein the cross member has a cross sectional size and/or shape that is different than both the closed cross sectional configuration of the first cross member body and the cross-sectional configuration of the plurality of second cross members.

Still another feature of the present disclosure includes wherein the in-plane body includes an in-plane wall that extends between an adjacent one of the first sidewall and the cross member in a direction that is parallel to the direction the cross member extends between the first and second side rails.

A further feature of the present disclosure includes wherein the first battery mounting assembly further includes an anti-dive bar, the anti-dive bar extending in a direction from one of the first and second side rails to same sidewall of the first and second sidewalls to which the in-plane body is coupled, the direction at which the anti-dive bar extends being both non-parallel and non-perpendicular to a direction at which the first side rail extends between the front end and the rear end of the first side rail.

Another feature of the present disclosure includes wherein the first and second sidewalls both include a plurality of base brackets and a plurality of side brackets, the plurality of base brackets and the plurality of side brackets extending different directions, at least one base bracket of only one of the first and second sidewalls being directly attached to either the first side rail or the second side rail.

Yet another feature of the present disclosure includes wherein only one of the first and second sidewalls include a plurality of secondary side brackets positioned between, and generally extending in the same direction as, at least two of the plurality of side brackets, the secondary side brackets being coupled to only one of the first side rail and the second side rail.

Still another feature of the present disclosure includes wherein the cage assembly further includes a cover, the cover and at least one of the first side rail and the second side rail being at opposing vertical ends of the first battery mounting assembly.

A further feature of the present disclosure includes wherein the cover extends above only a portion of the interior area.

Another feature of the present disclosure includes wherein the cage assembly directly contacts only one of the first and second side rails.

Yet another feature of the present disclosure includes the chassis assembly further comprising a second battery mounting assembly attached to both the first side rail and the second side rail, the second battery mounting assembly descending beneath a space between the first and second side rails, the second battery mounting assembly configured to removably couple at least one battery to the chassis assembly.

Still another feature of the present disclosure includes wherein the second battery mounting assembly comprises a first mounting segment attached to the first side rail and a second mounting segment attached to the second side rail, the first and second mounting segments each including a plurality of mounting brackets and a mounting rail.

A further feature of the present disclosure includes wherein the mounting rail is configured to be secured to the at least one battery.

Another feature of the present disclosure includes wherein each mounting bracket of the plurality of mounting brackets each include a base wall, a first sidewall, and a second sidewall, the first and second sidewalls of the mounting bracket extending in diverging directions away from the base wall.

Yet another feature of the present disclosure includes wherein each of the base wall, the first sidewall, and the second sidewall of the mounting bracket generally define a hollow space therebetween.

Still another feature of the present disclosure includes wherein each of the first sidewall and the second sidewall of the mounting bracket include an upper portion and a lower portion, the upper portion configured to be received in the recess of an adjacent one of the first and second side rails, the lower portion being configured to be inside a space between the first and second side rails and outside of the recess.

A further feature of the present disclosure includes wherein the upper portion includes an upper flange positioned to be secured to the base segment of the adjacent one of the first and second side rails.

Another feature of the present disclosure includes wherein the lower portion includes a lower flange positioned at a location that is inwardly and vertically offset from the upper flange.

Yet another feature of the present disclosure includes wherein the lower flange is configured to be positioned at a location that is at least inwardly offset in a horizontal direction from an end of the second segment of the adjacent one of the first and second side rails when the upper flange abuts the base segment of the corresponding first or second side rail.

Still a further feature of the present disclosure includes wherein the lower flange is configured for attachment to the mounting rail.

A further feature of the present disclosure includes wherein the lower flange is configured to abut the mounting rail along a rear side of the lower flange at a location that is horizontally and vertically offset from a second end of the second segment of the adjacent one of the first and second side rails.

Another feature of the present disclosure includes wherein both the upper flange and the lower flange each include at least one orifice sized to receive a mechanical fastener.

Yet another feature of the present disclosure includes wherein the base wall, first sidewall, and second sidewall of the mounting bracket are arranged to form an open-ended trapezoidal cross-sectional shape.

Still another feature of the present disclosure includes wherein the at least one battery is a plurality of batteries, and wherein the second battery mounting assembly is configured to secure the plurality of batteries to the chassis assembly in a horizontally extending side-by-side arrangement.

A further feature of the present disclosure includes wherein the second battery mounting assembly is configured for selective attachment and detachment of the mounting rail from the plurality of mounting brackets.

Another feature of the present disclosure includes wherein the at least one battery is selectively removable from the second battery mounting assembly.

Yet another feature of the present disclosure includes wherein the second battery mounting assembly comprises a proximal mounting assembly and a distal mounting assembly, the proximal mounting assembly being coplanar to, and separated by a space from, the distal mounting assembly.

Still another feature of the present disclosure includes wherein both of the first and second side rails further comprise a plurality of stiffeners secured to an inside surface of the base segment of an adjacent one of the first and second side rails.

A further feature of the present disclosure includes wherein the plurality of stiffeners include a first stiffener, and wherein the chassis assembly includes, for each of the first and second side rails, a first suspension mount coupled to a leaf spring and secured to an outer surface of the base segment of an adjacent one of the first and second side rails at a location that is aligned with the first stiffener on an opposing side of the base segment.

Another feature of the present disclosure includes wherein the first suspension mount is coupled to both the base segment and the first stiffener by at least one mechanical fastener.

Yet another feature of the present disclosure includes wherein the plurality of stiffeners include a second stiffener, and wherein the chassis assembly includes, for each of the first and second side rails, a second suspension mount coupled to the leaf spring and secured to the outer surface of the base segment at a location that is aligned with the second stiffener on an opposing side of the base segment.

Still another feature of the present disclosure includes wherein the second suspension mount is coupled to both the base segment and the second stiffener by at least one mechanical fastener.

A further feature of the present disclosure includes wherein the first stiffener and the second stiffener have a rectangular shape and a plurality of orifices configured to receive a mechanical fastener.

Another feature of the present disclosure includes wherein the first stiffener is co-planar with the second stiffener.

Yet another feature of the present disclosure includes wherein the plurality of stiffeners comprises a bump stiffener having a first segment and a second segment, wherein, for each of the first and second side rails, the first segment of the bump stiffener is secured to the base segment, and the second segment of the bump stiffener is secured to both the second segment of corresponding first or second side rail and a bump mount.

Still another feature of the present disclosure includes wherein the bump stiffener further includes an intermediate wall that extends between the first and second segments of the bump stiffener in a direction that is both non-parallel and non-perpendicular to the base segment and second segment of the adjacent one of the first or second side rail.

A further feature of the present disclosure includes wherein the second segment of the bump stiffener includes one or more orifices each positioned to receive a mechanical fastener that secures the bump stiffener to at least the bump mount.

Another feature of the present disclosure includes wherein the second flange is aligned with the bump stop on an opposite side of the second segment of the adjacent one of the first or second side rail.

Another aspect of the present disclosure includes a chassis assembly configured for use with a frame of a vehicle, the chassis assembly comprising: a first side rail that extends in a first direction between a first end and a second end of the first side rail; a second side rail that extends in the first direction between a first end and a second end of the second side rail, the first and second side rails being parallel to each other in the first direction and separated by a space in a second direction, the second direction being orthogonal to the first direction; and a first battery mounting assembly having a cage assembly configured for secure placement of one or more batteries in an interior area of the cage assembly, at least a portion of the cage assembly positioned above the space, the cage assembly being directly coupled to only one of the first side rail and the second side rail, and wherein the cage assembly is configured to be secured to a plurality of batteries in a vertically stacked arrangement.

A feature of the present disclosure includes wherein the cage assembly comprises a first sidewall and a second sidewall, one of the first sidewall and the second sidewall being directly coupled to one of the first side rail or the second side rail, the first and second sidewalls being on opposing sides of the cage assembly.

Yet another feature of the present disclosure includes wherein the first and second sidewalls each provide a mount for securing one of the plurality of batteries, the mount extending in the first direction from opposing ends of the adjacent first or second sidewall.

Still another feature of the present disclosure includes wherein one of the first sidewall and the second sidewall is coupled to a cross member that is attached to each of the first and second side rails by an in-plane body of the first battery mounting assembly.

A further feature of the present disclosure includes wherein the in-plane body includes an in-plane wall that extends between an adjacent one of the first sidewall and the cross member in a direction that is parallel to the second direction.

Another feature of the present disclosure includes wherein the first battery mounting assembly further includes an anti-dive bar, the anti-dive bar extending in a direction from one of the first and second side rails to same sidewall of the first and second sidewalls to which the in-plane body is coupled, the direction at which the anti-dive bar extends being both non-parallel and non-perpendicular to both the first direction and the second direction.

Yet another feature of the present disclosure includes wherein the first and second sidewalls both include a plurality of base brackets and a plurality of side brackets, the plurality of base brackets extending in the first direction and the plurality of side brackets extending in a third direction that is generally orthogonal to the first and second directions, at least one base bracket of only one of the first and second sidewalls being directly attached to the first side rail or the second side rail.

Still another feature of the present disclosure includes wherein only one of the first and second sidewalls include a plurality of secondary side brackets positioned between, and generally extending in the same direction as, at least two of the plurality of side brackets, the secondary side brackets being coupled to only one of the first side rail and the second side rail.

A further feature of the present disclosure includes wherein the cage assembly further includes a cover, the cover and at least one of the first side rail and the second side rail being at opposing vertical ends of the first battery mounting assembly.

Another feature of the present disclosure includes wherein the cover extends above only a portion of the interior area.

Yet another feature of the present disclosure includes wherein the cage assembly directly contacts only one of the first and second side rails.

Still another feature of the present disclosure includes the chassis assembly further comprising a second battery mounting assembly attached to both the first side rail and the second side rail, the second battery mounting assembly descending beneath the space between the first and second side rails, the second battery mounting assembly configured to removably couple at least one battery to the chassis assembly.

A further feature of the present disclosure includes wherein the second battery mounting assembly comprises a first mounting segment attached to the first side rail and a second mounting segment attached to the second side rail, the first and second mounting segments each including a plurality of mounting brackets and a mounting rail.

Another feature of the present disclosure includes wherein the mounting rail is configured to be secured to the at least one battery.

Yet another feature of the present disclosure includes wherein each mounting bracket of the plurality of mounting brackets includes a base wall, a first sidewall, and a second sidewall, the first and second sidewalls of the mounting bracket extending in diverging directions away from the base wall.

Still another feature of the present disclosure includes wherein each of the base wall, the first sidewall, and the second sidewall of the mounting bracket generally define a hollow space therebetween.

A further feature of the present disclosure includes wherein each of the first sidewall and the second sidewall of the mounting bracket include an upper portion and a lower portion, the upper portion configured to be received in a recess of an adjacent one of the first and second side rails, the lower portion being configured to be inside the space between the first and second side rails and outside of the recess.

Another feature of the present disclosure includes wherein the upper portion includes an upper flange positioned to be secured to a base segment of the adjacent one of the first and second side rails.

Yet another feature of the present disclosure includes wherein the lower portion includes a lower flange positioned at a location that is inwardly and vertically offset from the upper flange.

Still another feature of the present disclosure includes wherein the lower flange is configured to be positioned at a location that is at least inwardly offset in the second direction from an end of the second segment of the adjacent one of the first and second side rails when the upper flange abuts an adjacent one of the first and second side rail.

A further feature of the present disclosure includes wherein the lower flange is configured for attachment to the mounting rail.

Another feature of the present disclosure includes wherein the lower flange is configured to abut the mounting rail along a rear side of the lower flange at a location that is offset from an adjacent one of the first and second side rails.

A further feature of the present disclosure includes wherein both the upper flange and the lower flange each include at least one orifice sized to receive a mechanical fastener.

Another feature of the present disclosure includes wherein the base wall, first sidewall, and second sidewall of the mounting bracket are arranged to form an open-ended trapezoidal cross-sectional shape.

Yet another feature of the present disclosure includes wherein the at least one battery is a plurality of batteries, and wherein the second battery mounting assembly is configured to secure the plurality of batteries to the chassis assembly in a horizontally extending side-by-side arrangement.

Still another feature of the present disclosure includes wherein the second battery mounting assembly is configured for selective attachment and detachment of the mounting rail from the plurality of mounting brackets.

A further feature of the present disclosure includes wherein the at least one battery is selectively removable from the second battery mounting assembly.

Another feature of the present disclosure includes wherein the second battery mounting assembly comprises a proximal mounting assembly and a distal mounting assembly, the proximal mounting assembly being coplanar to, and separated by a space from, the distal mounting assembly.

Yet another feature of the present disclosure includes wherein each of the first and second side rails have a base segment, a first segment, and a second segment, the first and second segments extending from opposing ends of the base segment and wherein the base segment, the first segment, and the second segment define a recess, and wherein both of the first and second side rails further comprise a plurality of stiffeners secured to an inside surface of a base segment of an adjacent one of the first and second side rails.

Still another feature of the present disclosure includes wherein the plurality of stiffeners include a first stiffener, and wherein the chassis assembly includes, for each of the first and second side rails, a first suspension mount coupled to a leaf spring and secured to an outer surface of the base segment of an adjacent one of the first and second side rails at a location that is aligned with the first stiffener on an opposing side of the base segment.

A further feature of the present disclosure includes wherein the first suspension mount is coupled to both the base segment and the first stiffener by at least one mechanical fastener.

Another feature of the present disclosure includes wherein the plurality of stiffeners include a second stiffener, and wherein the chassis assembly includes, for each of the first and second side rails, a second suspension mount coupled to the leaf spring and secured to the outer surface of the base segment at a location that is aligned with the second stiffener on an opposing side of the base segment.

Yet another feature of the present disclosure includes wherein the second suspension mount is coupled to both the base segment and the second stiffener by at least one mechanical fastener.

Still another feature of the present disclosure includes wherein the first stiffener and the second stiffener have a rectangular shape and a plurality of orifices configured to receive a mechanical fastener.

A further feature of the present disclosure includes wherein the first stiffener is co-planar with the second stiffener.

Another feature of the present disclosure includes wherein the plurality of stiffeners comprises a bump stiffener having a first segment and a second segment, wherein, for each of the first and second side rails, the first segment of the bump stiffener is secured to the base segment, and the second segment of the bump stiffener is secured to both the second segment of corresponding first or second side rail and a bump mount.

Yet another feature of the present disclosure includes wherein the bump stiffener further includes an intermediate wall that extends between the first and second segments of the bump stiffener in a direction that is both non-parallel and non-perpendicular to the base segment and second segment of the adjacent one of the first or second side rail.

Still another feature of the present disclosure includes wherein the second segment of the bump stiffener includes one or more orifices each positioned to receive a mechanical fastener that secures the bump stiffener to at least the bump mount.

A further feature of the present disclosure includes wherein the second flange is aligned with the bump stop on an opposite side of the second segment of the adjacent one of the first or second side rail.

Another aspect of the present disclosure includes a chassis assembly configured for use with a frame of a vehicle, the chassis assembly comprising: a first side rail that extends in a first direction between a first end and a second end of the first side rail; a second side rail that extends in the first direction between a first end and a second end of the second side rail, the first and second side rails being parallel to each other in the first direction and separated by a space in a second direction, the second direction being orthogonal to the first direction; and a battery mounting assembly attached to both the first side rail and the second side rail, the battery mounting assembly descending beneath the space between the first and second side rails, the battery mounting assembly configured to removably couple at least one battery to the chassis assembly.

A feature of the present disclosure includes wherein the battery mounting assembly comprises a first mounting segment attached to the first side rail and a second mounting segment attached to the second side rail, the first and second mounting segments each including a plurality of mounting brackets and a mounting rail.

Another feature of the present disclosure includes wherein the mounting rail is configured to be secured to the at least one battery.

Yet another feature of the present disclosure includes wherein each mounting bracket of the plurality of mounting brackets includes a base wall, a first sidewall, and a second sidewall, the first and second sidewalls of the mounting bracket extending in diverging directions away from the base wall.

Still another feature of the present disclosure includes wherein each of the base wall, the first sidewall, and the second sidewall of the mounting bracket generally define a hollow space therebetween.

A further feature of the present disclosure includes wherein each of the first sidewall and the second sidewall of the mounting bracket include an upper portion and a lower portion, the upper portion configured to be received in a recess of an adjacent one of the first and second side rails, the lower portion being configured to be inside the space between the first and second side rails and outside of the recess.

A further feature of the present disclosure includes wherein the upper portion includes an upper flange positioned to be secured to a base segment of the adjacent one of the first and second side rails.

Another feature of the present disclosure includes wherein the lower portion includes a lower flange positioned at a location that is inwardly and vertically offset from the upper flange.

Yet another feature of the present disclosure includes wherein the lower flange is configured to be positioned at a location that is at least inwardly offset in the second direction from an end of the second segment of the adjacent one of the first and second side rails when the upper flange abuts an adjacent one of the first and second side rail.

Still another feature of the present disclosure includes wherein the lower flange is configured for attachment to the mounting rail.

A further feature of the present disclosure includes wherein the lower flange is configured to abut the mounting rail along a rear side of the lower flange at a location that is offset from an adjacent one of the first and second side rails.

Another feature of the present disclosure includes wherein both the upper flange and the lower flange each include at least one orifice sized to receive a mechanical fastener.

Another feature of the present disclosure includes wherein the base wall, first sidewall, and second sidewall of the mounting bracket are arranged to form an open-ended trapezoidal cross-sectional shape.

Yet another feature of the present disclosure includes wherein the at least one battery is a plurality of batteries, and wherein the battery mounting assembly is configured to secure the plurality of batteries to the chassis assembly in a horizontally extending side-by-side arrangement.

Still another feature of the present disclosure includes wherein the battery mounting assembly is configured for selective attachment and detachment of the mounting rail from the plurality of mounting brackets.

A further feature of the present disclosure includes wherein the at least one battery is selectively removable from the second battery mounting assembly.

Another feature of the present disclosure includes wherein the battery mounting assembly comprises a proximal mounting assembly and a distal mounting assembly, the proximal mounting assembly being coplanar to, and separated by a space from, the distal mounting assembly.

Yet another feature of the present disclosure includes wherein each of the first and second side rails have a base segment, a first segment, and a second segment, the first and second segments extending from opposing ends of the base segment and wherein the base segment, the first segment, and the second segment define a recess, and wherein both of the first and second side rails further comprise a plurality of stiffeners secured to an inside surface of a base segment of an adjacent one of the first and second side rails.

Still another feature of the present disclosure includes wherein the plurality of stiffeners include a first stiffener, and wherein the chassis assembly includes, for each of the first and second side rails, a first suspension mount coupled to a leaf spring and secured to an outer surface of the base segment of an adjacent one of the first and second side rails at a location that is aligned with the first stiffener on an opposing side of the base segment.

A further feature of the present disclosure includes wherein the first suspension mount is coupled to both the base segment and the first stiffener by at least one mechanical fastener.

Another feature of the present disclosure includes wherein the plurality of stiffeners include a second stiffener, and wherein the chassis assembly includes, for each of the first and second side rails, a second suspension mount coupled to the leaf spring and secured to the outer surface of the base segment at a location that is aligned with the second stiffener on an opposing side of the base segment.

Yet another feature of the present disclosure includes wherein the second suspension mount is coupled to both the base segment and the second stiffener by at least one mechanical fastener.

Still another feature of the present disclosure includes wherein the first stiffener and the second stiffener have a rectangular shape and a plurality of orifices configured to receive a mechanical fastener.

A further feature of the present disclosure includes wherein the first stiffener is co-planar with the second stiffener.

Another feature of the present disclosure includes wherein the plurality of stiffeners comprises a bump stiffener having a first segment and a second segment, wherein, for each of the first and second side rails, the first segment of the bump stiffener is secured to the base segment, and the second segment of the bump stiffener is secured to both the second segment of corresponding first or second side rail and a bump mount.

Yet another feature of the present disclosure includes wherein the bump stiffener further includes an intermediate wall that extends between the first and second segments of the bump stiffener in a direction that is both non-parallel and non-perpendicular to the base segment and second segment of the adjacent one of the first or second side rail.

Still another feature of the present disclosure includes wherein the second segment of the bump stiffener includes one or more orifices each positioned to receive a mechanical fastener that secures the bump stiffener to at least the bump mount.

A further feature of the present disclosure includes wherein the second flange is aligned with the bump stop on an opposite side of the second segment of the adjacent one of the first or second side rail.

Another aspect of the present disclosure includes a chassis assembly configured for use with a frame of a vehicle, the chassis assembly comprising: a first side rail that extends in a first direction between a first end and a second end of the first side rail; a second side rail that extends in the first direction between a first end and a second end of the second side rail, the first and second side rails being parallel to each other in the first direction and separated by a space in a second direction, the second direction being orthogonal to the first direction, each of the first and second side rails have a base segment, a first segment, and a second segment, the first and second segments extending in the second direction from opposing ends of the base segment and wherein the base segment, the first segment, and the second segment define a recess; a plurality of suspension mounts, a first plurality of suspension mounts attached to an outer surface of the first side rail, and a second plurality of the suspension mounts coupled to an outer surface of the second side rail; and a plurality of stiffeners, wherein, for each of the first and second side rails, a stiffener of the plurality of stiffeners is secured to a portion, but not all, of at least a base segment, each stiffener of the plurality of stiffeners being position at a location on a corresponding one of the first or second rail that aligns with at least one of the plurality of suspension mounts.

A feature of the present disclosure includes wherein the plurality of suspension mounts are configured to be attached to a leaf spring of a suspension system of the vehicle.

Another feature of the present disclosure includes wherein the each of the plurality of suspension mounts are coupled to both the base segment and at least one stiffener of the plurality of stiffeners by a plurality of mechanical fasteners.

Yet another feature of the present disclosure includes wherein, for each of the first side rail and the second side rail; the plurality of stiffeners comprises a first stiffener and a second stiffener, and the plurality of suspension mounts comprises a first suspension mount and a second suspension mount, the first and second suspension mounts coupled to a leaf spring, the first stiffener being secured to the outer surface of the base segment at a location that is aligned with the first stiffener on an opposing side of the base segment, and the second stiffener being secured to the outer surface of the base segment at a location that is aligned with the second stiffener on an opposing side of the base segment.

Still another feature of the present disclosure includes wherein, for each of the first side rail and the second side rail, the first suspension mount is coupled to both the base segment and the first stiffener by a plurality of mechanical fasteners, and wherein the second suspension mount is coupled to both the base segment and the second stiffener by at least one mechanical fastener.

A further feature of the present disclosure includes wherein the first stiffener and the second stiffener have a rectangular shape and a plurality of orifices configured to receive a mechanical fastener.

Another feature of the present disclosure includes wherein, for each of the first side rail and the second side rail, the first stiffener is co-planar with the second stiffener.

Yet another feature of the present disclosure includes wherein the plurality of stiffeners comprises a bump stiffener having a first segment and a second segment, wherein, for each of the first and second side rails, the first segment of the bump stiffener is secured to the base segment, and the second segment of the bump stiffener is secured to both the second segment of corresponding first or second side rail and a bump mount.

Still another feature of the present disclosure includes wherein the bump stiffener further includes an intermediate wall that extends between the first and second segments of the bump stiffener in a direction that is both non-parallel and non-perpendicular to the base segment and second segment of the adjacent one of the first or second side rail.

A further feature of the present disclosure includes wherein the second segment of the bump stiffener includes one or more orifices each positioned to receive a mechanical fastener that secures the bump stiffener to at least the bump mount.

Another feature of the present disclosure includes wherein the second flange is aligned with the bump stop on an opposite side of the second segment of the adjacent one of the first or second side rail.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A chassis assembly configured for use with a frame of a vehicle, the chassis assembly comprising:

a first side rail and a second side rail, the first side rail being generally parallel to, and horizontally offset from, the second side rail, each of the first and second side rails comprising:

a base segment;

a first segment extending from a first end of the base segment; and a second segment extending from a second end of the base segment, wherein the base segment, the first segment, and the second segment of each of the first and second side rails define a recess sized to receive an end portion of a cross member; and a plurality of cross members extending between and attached to the first and second side rails, the plurality of cross members comprising a plurality of first cross members, each first cross member of the plurality of first cross members having a first cross member body, a first flange, and a second flange, the first cross member body having a length that extends from a first end of the first cross member body to a second end of the first cross member body, the first cross member body having a closed cross sectional configuration that is uniform across the length of the first cross member body, the first flange secured to the first end of the first cross member body and disposed within the recess of the first side rail and having a plurality of orifices and a first aperture that is sized to receive insertion of the first cross member body, the plurality of orifices of the first flange positioned outside of the first aperture and configured to each receive a mechanical fastener to attach the first flange to the base segment within the recess of the first side rail, and the second flange secured to the second end of the first cross member body and disposed within the recess of the second side rail and having a plurality of orifices and a second aperture that is sized to receive insertion of the first cross member body, the plurality of orifices of the second flange positioned outside of the second aperture and configured to each receive another mechanical fastener to attach the second flange to the base segment within the recess of the second side rail.

2. The chassis assembly of claim 1, wherein each first cross member of the plurality of first cross members extends from the base segment of the first side rail to the base segment of the second side rail.

3. The chassis assembly of claim 1, wherein the chassis assembly further includes a suspension system that is coupled to both the first side rail and the second side rail, and is not directly coupled to the plurality of first cross members.

4. The chassis assembly of claim 1, wherein the closed cross sectional configuration is a closed loop shape or a circular shape.

5. The chassis assembly of claim 1, wherein at least some of the plurality of first cross members include at least one mounting bracket coupled to the first cross member body.

6. The chassis assembly of claim 1, wherein the plurality of orifices of at least one of the first flange and the second flange are arranged to orient the at least one mounting bracket in an upwardly direction away from the first cross member body when the first cross member body is attached to the first side rail and the second side rail.

7. The chassis assembly of claim 1, wherein the plurality of first cross members comprises a proximate first cross member, an intermediate first cross member, and a distal first cross member, and wherein the plurality of cross members further include a plurality of second cross members having a cross sectional configuration that is different than the closed cross sectional configuration of the first cross member body, the plurality of second cross members comprising a front second cross member and a rear second cross member, the front second cross member being coupled to a front end of each of the first and second side rails, the rear second cross member being coupled to a rear end of each of the first and second side rails.

8. A chassis assembly configured for use with a frame of a vehicle, the chassis assembly comprising:

a first side rail and a second side rail, the first side rail being generally parallel to, and horizontally offset from, the second side rail; and a plurality of cross members attached to the first and second side rails, the plurality of cross members comprising a plurality of first cross members, each first cross member of the plurality of first cross members having a first cross member body, a first flange, and a second flange, the first cross member body having a length that extends from a first end of the first cross member body to a second end of the first cross member body, the first cross member body having a closed cross sectional configuration that is uniform across the length of the first cross member body, the first flange secured to the first end and having a plurality of orifices and an aperture that is sized to receive insertion of the first cross member body, the plurality of orifices of the first flange configured to each receive a mechanical fastener to attach the first flange to the first side rail, and the second flange secured to the second end and having a plurality of orifices and an aperture that is sized to receive insertion of the first cross member body, the plurality of orifices of the second flange configured to each receive another mechanical fastener to attach the second flange to the second side rail, wherein the plurality of first cross members comprises a proximate first cross member, an intermediate first cross member, and a distal first cross member, and wherein the plurality of cross members further include a plurality of second cross members having a cross sectional configuration that is different than the closed cross sectional configuration of the first cross member body, the plurality of second cross members comprising a front second cross member and a rear second cross member, the front second cross member being coupled to a front end of each of the first and second side rails, the rear second cross member being coupled to a rear end of each of the first and second side rails, and wherein the front second cross member and the proximate first cross member define, at least in part, a first space, and wherein the chassis assembly further includes a first battery mounting assembly having a cage assembly configured for secure placement of one or more batteries in an interior area of the cage assembly, at least a portion of the cage assembly positioned above the first space, and wherein the cage assembly is directly coupled to only one of the first side rail and the second side rail.

9. The chassis assembly of claim 8, wherein the cage assembly is configured to secure a plurality of the one or more batteries within the interior area in a vertically stacked orientation.

10. A chassis assembly configured for use with a frame of a vehicle, the chassis assembly comprising:

a first side rail that extends between a first end and a second end of the first side rail;

a second side rail that extends between a first end and a second end of the second side rail, the first and second side rails being parallel to each other in a first direction and separated by a space in a second direction, the second direction being orthogonal to the first direction; and a first battery mounting assembly having a cage assembly configured for secure placement of a plurality of batteries in an interior area of the cage assembly, at least a portion of the cage assembly positioned above the space, the cage assembly being directly coupled to only one of the first side rail and the second side rail to provide a degree of float of the cage assembly between the first and second side rails in a manner that can protect the integrity of the plurality of batteries, and wherein the cage assembly is configured secure a plurality of batteries to the cage assembly in a vertically stacked arrangement.

11. The chassis assembly of claim 10, wherein the cage assembly comprises a first sidewall and a second sidewall, one of the first sidewall and the second sidewall being directly coupled to one of the first side rail or the second side rail, the first and second sidewalls being on opposing sides of the cage assembly, and wherein the first and second sidewalls each provide a mount for securing at least one of the plurality of batteries, the mount extending in the first direction from opposing ends of the adjacent first or second sidewall.

12. The chassis assembly of claim 11, wherein the first battery mounting assembly further includes an anti-dive bar, the anti-dive bar extending in a direction from one of the first and second side rails to same sidewall of the first sidewall and the second sidewall to which an in-plane body is coupled, the direction at which the anti-dive bar extends being both non-parallel and non-perpendicular to both the first direction and the second direction.

13. The chassis assembly of claim 12, wherein the first sidewall and the second sidewall both include a plurality of base brackets and a plurality of side brackets, the plurality of base brackets extending in the first direction and the plurality of side brackets extending in a third direction that is generally orthogonal to the first and second directions, at least one base bracket of only one of the first sidewall and the second sidewall being directly attached to the first side rail or the second side rail.

14. The chassis assembly of claim 13, wherein only one of the first sidewall and the second sidewall include a plurality of secondary side brackets positioned between, and generally extending in the same direction as at least two of the plurality of side brackets, the secondary side brackets being coupled to only one of the first side rail and the second side rail.

15. The chassis assembly of claim 11, wherein the cage assembly directly contacts only one of the first and second side rails.

16. The chassis assembly of any one of claims 10, further comprising a second battery mounting assembly attached to both the first side rail and the second side rail, the second battery mounting assembly descending beneath the space between the first and second side rails, the second battery mounting assembly configured to removably couple at least one battery to the chassis assembly.

17. A chassis assembly configured for use with a frame of a vehicle, the chassis assembly comprising:

a first side rail that extends in a first direction between a first end and a second end of the first side rail;

a second side rail that extends in the first direction between a first end and a second end of the second side rail, the first and second side rails being parallel to each other in the first direction and separated by a space in a second direction, the second direction being orthogonal to the first direction, each of the first and second side rails have a base segment, a first segment, and a second segment, the first and second segments extending in the second direction from opposing ends of the base segment, and wherein the base segment, the first segment, and the second segment define a recess;

a first plurality of suspension mounts coupled to an outer surface of the base segment of the first side rail, and a second plurality of suspension mounts coupled to an outer surface of the base segment of the second side rail; and a plurality of stiffeners, wherein, for each of the first and second side rails, a stiffener of the plurality of stiffeners is secured to a portion, but not all, of at least the base segment, each stiffener of the plurality of stiffeners being positioned on a corresponding one of the first side rail or the second side rail that aligns with at least one of the first plurality of suspension mounts and the second plurality of suspension mounts, wherein each suspension mount of the first and second plurality of suspension mounts is coupled by at least one mechanical fastener passing through the suspension mount, the outer surface of the base segment, and the stiffener such that the stiffener is coplanar with the adjacent suspension mount;

and wherein the base segment, the first segment, and the second segment define a side rail recess configured for receiving placement of components of the chassis assembly.

18. The chassis assembly of claim 17, wherein the first plurality of suspension mounts and the second plurality of suspension mounts are each configured to be attached to a leaf spring of a suspension system of the vehicle, each of the first plurality of suspension mounts and the second plurality of suspension mounts being coupled to both the base segment and at least one stiffener of the plurality of stiffeners by a plurality of mechanical fasteners.

19. The chassis assembly of claim 17, wherein, for each of the first side rail and the second side rail:

the plurality of stiffeners comprises a first stiffener and a second stiffener, and the associated first or second plurality of suspension mounts comprises a first suspension mount and a second suspension mount, the first and second suspension mounts coupled to a leaf spring, the first stiffener being secured to the outer surface of the base segment at a location that is aligned with the first stiffener on an opposing side of the base segment, and the second stiffener being secured to the outer surface of the base segment at a location that is aligned with the second stiffener on an opposing side of the base segment.

20. The chassis assembly of claim 19, wherein the plurality of stiffeners comprises a bump stiffener having a first stiffener segment and a second stiffener segment, wherein, for each of the first and second side rails, the first stiffener segment of the bump stiffener is secured to the base segment and the second stiffener segment of the bump stiffener is secured to both the second segment of the corresponding first or second side rail and a bump mount.

* * * * *